US012576661B2

(12) United States Patent
Koike et al.

(10) Patent No.: US 12,576,661 B2
(45) Date of Patent: Mar. 17, 2026

(54) RECORDING METHOD AND RECORDING APPARATUS

(71) Applicant: SEIKO EPSON CORPORATION, Tokyo (JP)

(72) Inventors: Naoki Koike, Matsumoto (JP); Ippei Okuda, Shiojiri (JP)

(73) Assignee: SEIKO EPSON CORPORATION (JP)

(*) Notice: Subject to any disclaimer, the term of this patent is extended or adjusted under 35 U.S.C. 154(b) by 161 days.

(21) Appl. No.: 18/417,230

(22) Filed: Jan. 19, 2024

(65) Prior Publication Data

US 2024/0253379 A1 Aug. 1, 2024

(30) Foreign Application Priority Data

Jan. 20, 2023 (JP) ................................ 2023-007308

(51) Int. Cl.
*B41M 3/00* (2006.01)
*B41J 2/21* (2006.01)
(Continued)

(52) U.S. Cl.
CPC ................ *B41M 3/008* (2013.01); *B41J 2/21* (2013.01); *B41M 5/00* (2013.01); *B41M 5/0017* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

| | | | | |
|---|---|---|---|---|
| 6,267,476 B1 * | 7/2001 | Kato | .................... | G06K 15/105 347/100 |
| 6,439,708 B1 * | 8/2002 | Kato | ...................... | B41J 2/2114 347/100 |

(Continued)

FOREIGN PATENT DOCUMENTS

JP 2018-165029 A 10/2018

*Primary Examiner* — Manish S Shah
(74) *Attorney, Agent, or Firm* — Harness, Dickey & Pierce, P.L.C.

(57) ABSTRACT

A recording method according to an embodiment of the present disclosure is a recording method to perform recording on a recording medium in a manner such that while a relative position between an ink jet head and the recording medium is transferred, a scan to eject an ink from the ink jet head so as to be adhered to the recording medium is performed a plurality of times for the recording. The method described above includes a step of adhering a treatment liquid containing an aggregating agent to the recording medium; a step of ejecting a color ink composition containing a colorant from the ink jet head so as to be adhered to the recording medium; and a step of ejecting a clear ink composition containing a resin from the ink jet head so as to be adhered to the recording medium. In the recording method described above, the color ink composition is adhered to the same scan region by performing the scan at least two times, the clear ink composition is adhered by the same scan as a final scan of the at least two scans to a scan region of the recording medium to which the color ink composition is adhered, and an adhesion amount of the clear ink composition adhered by the final scan in the region to which the color ink composition and the clear ink composition are adhered is 80 percent by mass or more of a total adhesion amount of the clear ink composition in the region.

10 Claims, 2 Drawing Sheets

(51) Int. Cl.
*B41M 5/00* (2006.01)
*C09D 11/106* (2014.01)
*C09D 11/324* (2014.01)
*C09D 11/54* (2014.01)

(52) U.S. Cl.
CPC .......... *C09D 11/106* (2013.01); *C09D 11/324* (2013.01); *C09D 11/54* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 6,902,249 | B2 * | 6/2005 | Suzuki | B41J 3/407 347/15 |
| 7,275,804 | B2 * | 10/2007 | Matsushima | B41J 11/00216 347/95 |
| 8,500,268 | B2 * | 8/2013 | Hill | B41J 2/2117 347/101 |
| 2004/0201656 | A1 * | 10/2004 | Koitabashi | B41J 2/01 347/95 |
| 2006/0238592 | A1 * | 10/2006 | Kadomatsu | B41J 11/00214 347/100 |
| 2013/0176369 | A1 * | 7/2013 | Gotou | B41M 5/0023 347/100 |
| 2013/0201252 | A1 * | 8/2013 | Namba | C09D 11/322 347/21 |
| 2015/0035896 | A1 * | 2/2015 | Gotou | B41J 2/01 347/20 |
| 2015/0103116 | A1 * | 4/2015 | Gotou | C09D 11/38 347/21 |
| 2017/0166767 | A1 * | 6/2017 | Watanabe | C09D 11/322 |
| 2018/0281492 | A1 | 10/2018 | Matsuzaki et al. | |
| 2019/0284411 | A1 * | 9/2019 | Okuda | C09D 11/324 |
| 2019/0292388 | A1 * | 9/2019 | Ohashi | B41M 5/0023 |
| 2021/0024767 | A1 * | 1/2021 | Asakawa | B41J 11/00216 |

* cited by examiner

RECORDING METHOD AND RECORDING APPARATUS

The present application is based on, and claims priority from JP Application Serial Number 2023-007308, filed Jan. 20, 2023, the disclosure of which is hereby incorporated by reference herein in its entirety.

BACKGROUND

1. Technical Field

The present disclosure relates to a recording method and a recording apparatus.

2. Related Art

Since being able to record a highly fine image by a relatively simple apparatus, an ink jet recording method has been rapidly developed in various fields. Among the developments, an attempt to obtain an excellent image quality using a treatment liquid which rapidly fixes an ink droplet on a recording medium has been carried out (for example, see JP-A-2018-165029).

However, in the image, portions not sufficiently colored by the ink and/or fine portions, which are so-called pinholes, to which the ink is not adhered are generated, and as a result, an image filling property may be inferior in some cases. In addition, an abrasion resistance of a recorded matter in which an image is formed may also be inferior in some cases. Hence, the image is required to have, besides an excellent image quality, excellent filling property and abrasion resistance.

SUMMARY

According to an aspect of the present disclosure, there is provided a recording method to perform recording on a recording medium in a manner such that while a relative position between an ink jet head and the recording medium is transferred, a scan to eject an ink from the ink jet head so as to be adhered to the recording medium is performed a plurality of times for the recording, the method comprising: a step of adhering a treatment liquid containing an aggregating agent to the recording medium; a step of ejecting a color ink composition containing a colorant from the ink jet head so as to be adhered to the recording medium; and a step of ejecting a clear ink composition containing a resin from the ink jet head so as to be adhered to the recording medium. In the recording method described above, the color ink composition is adhered to the same scan region by performing the scan at least two times, the clear ink composition is adhered by the same scan as a final scan of the at least two scans to a scan region of the recording medium to which the color ink composition is adhered, and an adhesion amount of the clear ink composition adhered by the final scan in the region to which the color ink composition and the clear ink composition are adhered is 80 percent by mass or more of a total adhesion amount of the clear ink composition in the region.

According to another aspect of the present disclosure, there is provided a recording apparatus to perform recording using the recording method according to the above aspect, the apparatus comprising: the color ink composition; the clear ink composition; and the ink jet head.

DESCRIPTION OF EMBODIMENTS

Figure 1:
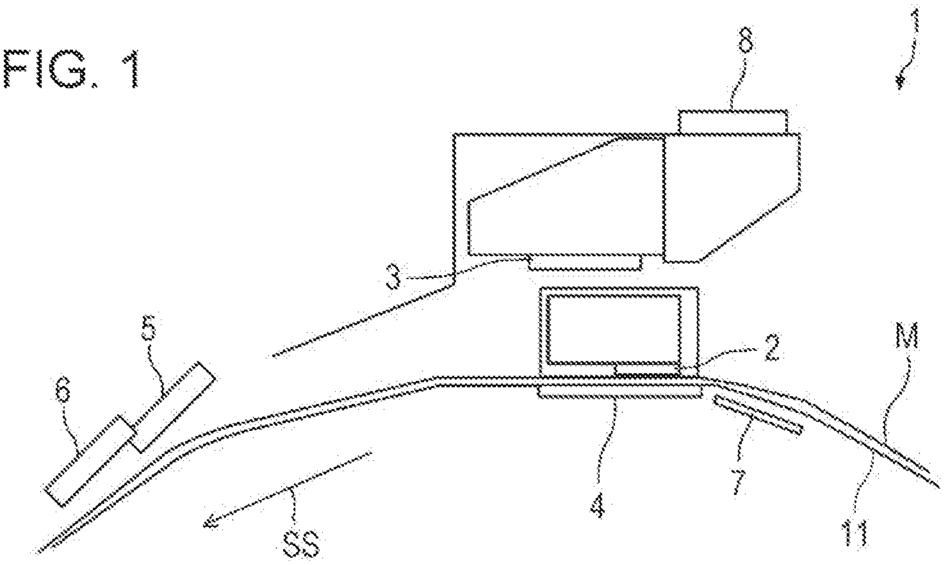
FIG. 1 is a schematic cross-sectional view of a serial type ink jet recording apparatus.

Hereinafter, embodiments of the present disclosure will be described. The following embodiments are to explain examples of the present disclosure. The present disclosure is not limited at all to the following embodiments and includes variously modified and/or changed embodiments to be performed without departing from the scope of the present disclosure. In addition, all the constituents described below are not always required to be essential constituents of the present disclosure.

1. Recording Method

A recording method according to an embodiment of the present disclosure is a recording method to perform recording on a recording medium in a manner such that while a relative position between an ink jet head and the recording medium is transferred, a scan to eject an ink from the ink jet head so as to be adhered to the recording medium is performed a plurality of times for the recording. The recording method described above includes a step of adhering a treatment liquid containing an aggregating agent to the recording medium, a step of ejecting a color ink composition containing a colorant from the ink jet head so as to be adhered to the recording medium, and a step of ejecting a clear ink composition containing a resin from the ink jet head so as to be adhered to the recording medium. In the recording method described above, the color ink composition is adhered to the same scan region by performing the scan at least two times, the clear ink composition is adhered by the same scan as a final scan of the at least two scans to a scan region of the recording medium to which the color ink composition is adhered, and an adhesion amount of the clear ink composition adhered by the final scan in the region to which the color ink composition and the clear ink composition are adhered is 80 percent by mass or more of a total adhesion amount of the clear ink composition in the region.

An attempt to obtain an excellent image quality using a treatment liquid which rapidly fixes an ink droplet on a recording medium has been carried out. In recent years, portions not sufficiently colored by the ink and/or fine portions, which are so-called pinholes, to which the ink is not adhered have been generated in an image, and as a result, the filling property thereof was inferior. The reason for this is believed to be that since a reaction between the treatment liquid and the ink droplet occurs, the fluidity thereof is decreased, and as a result, the ink droplet is not likely to wet-spread on the recording medium. In addition, the abrasion resistance of a recorded matter in which an image is formed is also inferior. The reason for this is believed to be that since a reaction between an ink component and the treatment liquid occurs, coarse and large particles are formed, and as a result, an ink coating film is not likely to be smoothed.

Accordingly, the present inventors carried out intensive research, and as a result, it was found that in a multi-pass recording in which a color ink composition (hereinafter, also referred to as "color ink" in some cases) is recorded on the same region by at least two passes, when a clear ink composition (hereinafter, also referred to as "clear ink" in some cases) in a predetermined amount or more is adhered simultaneously with the color ink by a final pass, an excellent image quality can be obtained, and in addition, excellent filling property and abrasion resistance can also be obtained.

It is believed that since the treatment liquid is also able to react with the clear ink, when the color ink and the clear ink are simultaneously ejected, by the presence of the clear ink, the reaction between the color ink and the treatment liquid is suppressed, the wet-spreadability of the color ink droplet on the recording medium is improved, and hence, the filling property is improved. In addition, it is also believed that since the clear ink in a predetermined amount or more is simultaneously ejected with the color ink by the final pass, the coating film of the color ink can be more sufficiently protected by the component of the clear ink, and hence, the abrasion resistance is improved.

Hereinafter, the steps of the recording method according to this embodiment will be described.

1.1. Recording Method 1.1.1. Ink Jet Method

The recording method according to this embodiment is a recording method to perform recording on a recording medium, and the recording is performed in a manner such that while a relative position between an ink jet head and a recording medium is transferred, a scan to eject an ink from the ink jet head so as to be adhered to the recording medium is performed a plurality of times.

Recording Medium

Although a recording medium which is used for the recording method according to this embodiment is not particularly limited, for example, an absorbing recording medium, such as paper, a film, or a cloth, a low-absorbing recording medium, such as printing paper, or a non-absorbing recording medium, such as a metal, glass, or a high molecular weight material, may be mentioned.

The low-absorbing or the non-absorbing recording medium indicates a recording medium which hardly absorbs a liquid or which absorbs no liquid at all, respectively. In a quantitative point of view, the non-absorbing or the low-absorbing recording medium indicates "a recording medium having a water absorption amount of 10 $mL/m^2$ or less from a contact start to 30 $mseconds^{1/2}$ measured by Bristow method". This Bristow method is a most popular measurement method of a liquid absorption amount in a short time and has also been employed by Japan Technical Association of the Pulp and Paper Industry (JAPAN TAPPI). The details of the test method have been disclosed in Standard No. 51 "Paper and Paperboard-Liquid Absorption Test Method-Bristow Method", JAPAN TAPPI PAPER AND PULP TEST METHODS, 2000. On the other hand, the absorbing recording medium indicates a recording medium corresponding to neither the non-absorbing recording medium nor the low-absorbing recording medium.

Although the absorbing recording medium is not particularly limited, for example, regular paper, cardboard, or linerboard may be mentioned. As the linerboard, a board formed from craft pulp or paper, such as waste paper, may be mentioned.

In addition, as the low-absorbing recording medium, for example, a recording medium in which a low-absorbing coating layer is provided on a substrate surface may be mentioned, and so-called coating paper may be mentioned. For example, as coating paper having a substrate made of paper, printing paper, such as art paper, coated paper, or mat paper, may be mentioned, and as coating paper having a substrate made of a plastic film, for example, there may be mentioned paper in which a plastic surface formed, for example, from a poly(vinyl chloride), a poly(ethylene terephthalate), a polycarbonate, a polystyrene, a polyurethane, a polyethylene, or a polypropylene is coated, for example, with a polymer or is coated with particles of silica, titanium, or the like together with a binder.

As the non-absorbing recording medium, for example, a medium in which a plastic is coated on a substrate such as paper, a medium in which a plastic film is adhered to a substrate such as paper, or a plastic film having no absorbing layer (receiving layer) may be mentioned. As the plastic in this case, for example, there may be mentioned a poly(vinyl chloride), a poly(ethylene terephthalate), a polycarbonate, a polystyrene, a polyurethane, a polyethylene, or a polypropylene.

In addition, the recording medium may be colorless transparent, translucent, colored transparent, chromatic opaque, achromatic opaque, or the like. In addition, the recording medium itself may be colored, translucent, or transparent.

Among those recording media described above, the recording medium used for the recording method according to this embodiment is preferably a low-absorbing recording medium or a non-absorbing recording medium. Since the low-absorbing recording medium or the non-absorbing recording medium is unlikely to absorb a liquid and is also inferior in terms of liquid wet-spreadability, the problems of the image quality and the filling property are more liable to be generated. Furthermore, the abrasion resistance also tends to be degraded. On the other hand, according to the recording method of this embodiment, even when the recording is performed on the recording medium as described above, an excellent image quality is obtained, and in addition, excellent filling property and abrasion resistance can also be preferably obtained.

Scan Method

In the recording method according to this embodiment, while a relative position between an ink jet head and the recording medium is transferred, a scan (main scan) to eject an ink from the ink jet head so as to be adhered to the recording medium is performed a plurality of times for the recording.

The "relative position between an ink jet head and the recording medium is transferred" indicates that the ink jet head may be transferred with respect to the recording medium or that the recording medium may be transferred with respect to the ink jet head. In addition, the position of the ink jet head and that of the recording medium may both be transferred so that the relative positional relationship between the ink jet head and the recording medium is changed.

Figure 2:
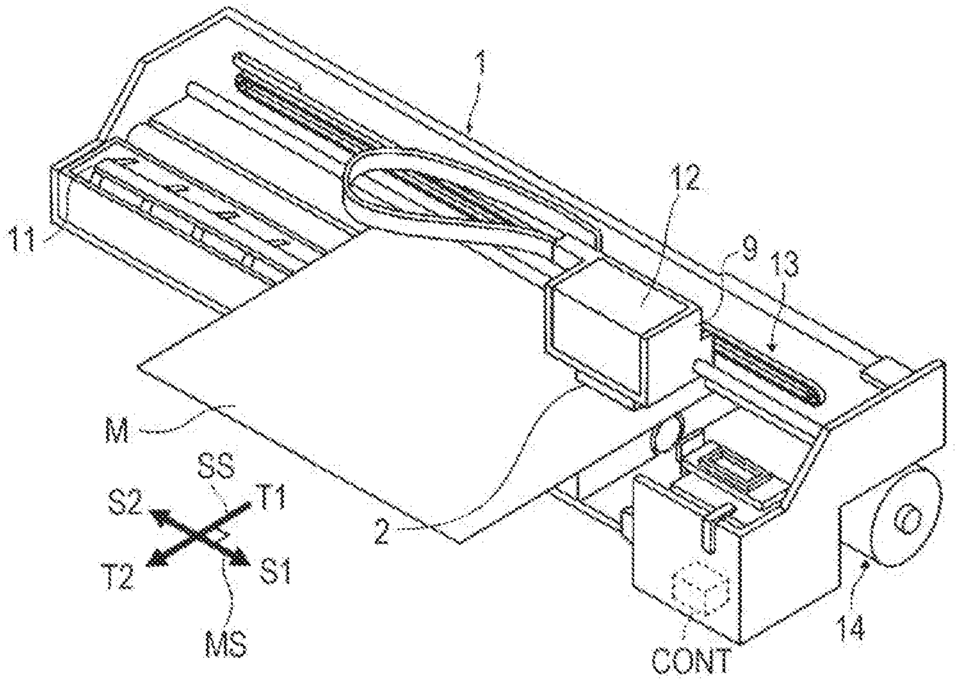
FIG. 2 is a perspective view showing one example of a carriage peripheral structure of the serial type ink jet recording apparatus.

Hence, for example, in a serial type ink jet recording apparatus 1 (which will be described later) as shown in FIGS. 1 and 2, the scan (main scan) indicates the recording performed by transferring a carriage 9 mounting an ink jet head 2 in a direction (main scanning direction MS) orthogonal to a transport direction (sub-scanning direction SS) of a recording medium M. In the case described above, between the scans, a sub-scan is preferably performed. The sub-scan is performed by transferring the relative position between the ink jet head and the recording medium in a direction intersecting the direction of the scan (main scan). In addition, in the sub-scan, the ink or the like is neither ejected from the ink jet head nor adhered to the recording medium, and hence, the sub-scan is different from the scan (main scan).

In addition, in a lateral scan type ink jet recording apparatus 300 (which will be described later) as shown, for example, in FIGS. 3 and 4, the scan (main scan) performs the recording in a manner such that while a carriage 320 mounting an ink jet head 2 (not shown) is transferred in a main scanning direction MS, the ink is ejected from the ink jet head.

In the case described above, between the scans, a sub-scan to transfer the carriage 320 in a sub-scanning direction SS may be performed.

Figure 3:
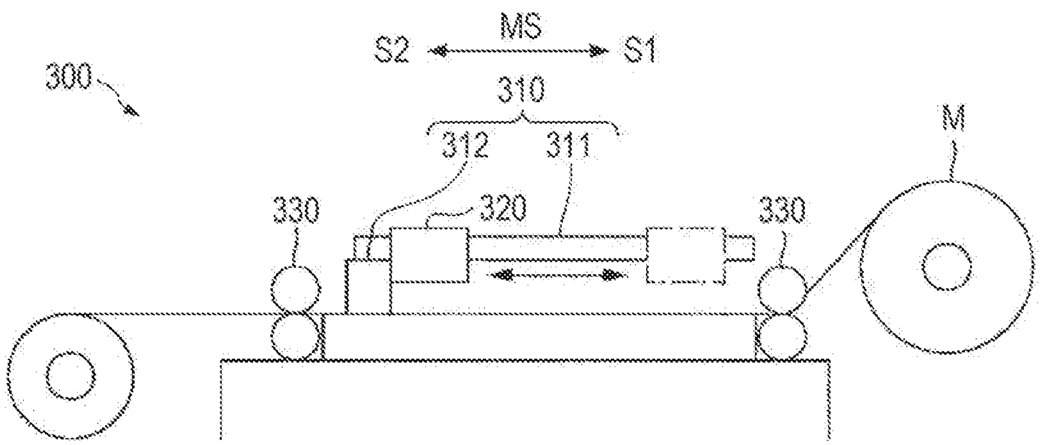
FIG. 3 is a schematic side view of an ink jet recording apparatus to perform recording by a lateral scan method.
Figure 4:
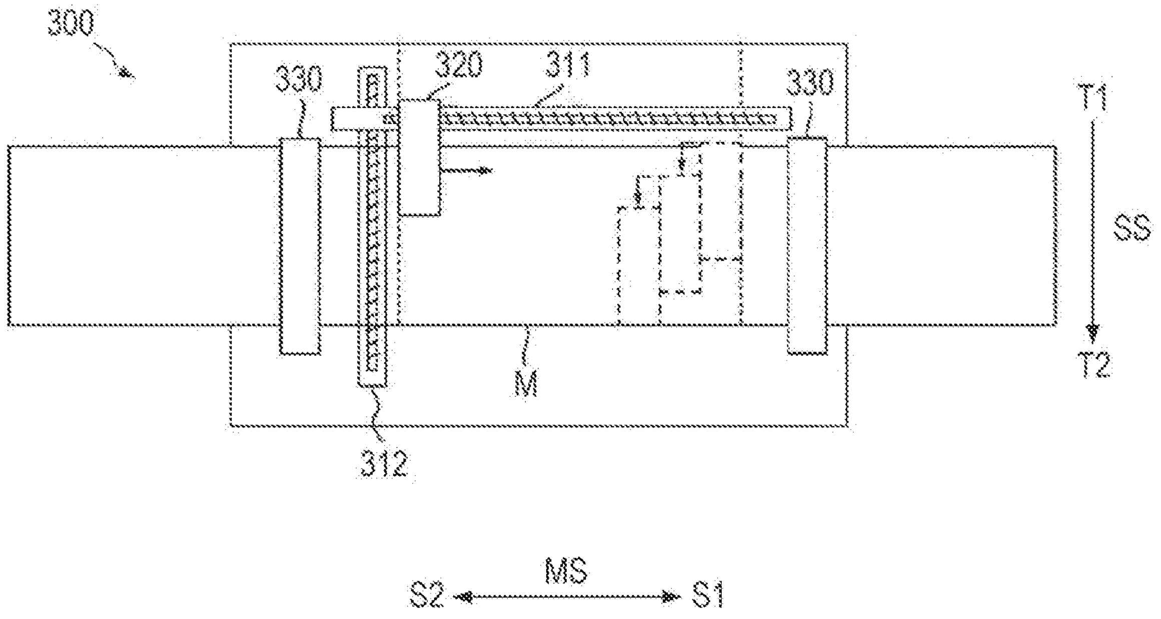
FIG. 4 is a schematic plan view of the ink jet recording apparatus to perform recording by a lateral scan method.

In FIGS. 3 and 4, a length of the ink jet head 2 in the sub-scanning direction is shorter than a length of the recording medium M in the sub-scanning direction. Accordingly, when the sub-scan is performed, the recording can be widely performed on the recording medium M in the sub-scanning direction.

In the case described above, the sub-scan is preferably performed so that by a scan before the sub-scan and a scan after the sub-scan, scan regions (in each of which the ink jet head and the recording medium M are intersected with each other by one main scan) are at least partially overlapped with each other. Accordingly, by the scan performed at least two times, the ink can be adhered to the same region of the recording medium.

After the recording is completed on the recording medium M by a plurality of scans, the recording medium M is transported in the main scanning direction MS so as to transport a new part of the recording medium to a position between two transport rollers 330, and next recording is performed.

On the other hand, the length of the ink jet head 2 in the sub-scanning direction may be made equal to or larger than the length of the recording medium M in the sub-scanning direction. In the case described above, without performing the sub-scan, the recording can be widely performed on the recording medium M in the sub-scanning direction. In the case described above, when the scan is performed at least two times, the ink can also be adhered to the same region of the recording medium by the at least two scans. In addition, in the case described above, between the scans, the sub-scan may also be performed. Accordingly, a recording resolution of an image on the recording medium M in the sub-scanning direction can also be increased.

When the scan is performed at least two times so that the ink is adhered to the same region of the recording medium by the at least two scans, the position of the ink jet head projected in the main scanning direction in a first scan is at least partially overlapped with the position of the ink jet head projected in the main scanning direction in a second scan.

When the ink is adhered to the same region of the recording medium by at least two scans, the ink to be adhered to the same region can be separately adhered by the at least two scans.

The scan and the sub-scan may be performed by transferring the position of the recording medium M with respect to that of the ink jet head 2. That is, the scan and the sub-scan may be performed by transferring the relative position between the recording medium M and the ink jet head 2.

The number of scans (also called number of passes) to adhere the ink to the same region of the recording medium can be adjusted by the distance of the sub-scan. In addition, when the sub-scan is not performed between the scans, the number of scans may be arbitrarily adjusted.

1.1.2. Ink Adhesion Method

In the recording method according to this embodiment, the color ink composition is adhered to the same scan region by performing the scan (main scan) at least two times, the clear ink composition is adhered by the same scan as a final scan of the at least two scans to a scan region of the recording medium to which the color ink composition is adhered, and in the region to which the color ink composition and the clear ink composition are adhered, an adhesion amount of the clear ink composition adhered by the final scan is 80 percent by mass or more of a total adhesion amount of the clear ink composition in the region.

In the case in which "the color ink composition is adhered to the same scan region by performing the scan (main scan) at least two times, and the clear ink composition is adhered by the same scan as a final scan of the at least two scans to a scan region of the recording medium to which the color ink composition is adhered", in the final main scan, the color ink composition and the clear ink composition are approximately simultaneously adhered (simultaneous adhesion) to the same region of the recording medium. Accordingly, by the presence of the clear ink, it is believed that the reaction between the color ink and the treatment liquid is suppressed, the wet-spreadability of a color ink droplet on the recording medium is improved, and hence, the filling property is improved.

The simultaneous adhesion as described above may be performed, for example, in a manner such that in a nozzle surface of the ink jet head, nozzle lines in each of which nozzles are arranged in the sub-scanning direction SS are provided along the main scanning direction MS; when being projected along the main scanning direction MS, the nozzle lines are arranged so as to be at least partially overlapped with each other in the sub-scanning direction SS; and the color ink composition and the clear ink composition can be ejected from the respective nozzle lines.

As for the arrangement of the overlapped nozzles in the ink jet head, for example, in the case of the serial type ink jet recording apparatus 1 shown in FIGS. 1 and 2, although a nozzle line (not shown) to eject the color ink composition and a nozzle line (not shown) to eject the clear ink composition may be overlapped 100% in the sub-scanning direction SS, a nozzle line to eject the clear ink composition and a nozzle line to eject the color ink composition which are to be used in the final scan described above may be arranged so as to be at least partially overlapped with each other in the sub-scanning direction SS. According to the arrangement as described above, at least in the final main scan, the color ink composition and the clear ink composition can be simultaneously adhered.

For example, in the example shown in FIG. 2, when the distance of one sub-scan is set to one half of the length of the ink jet head 2 in the sub-scanning direction, by two scans, the recording is performed on the same region of the recording medium. In this case, the ink jet head 2 has nozzle lines in each of which nozzles are arranged in the sub-scanning direction, and the length of the ink jet head 2 in the sub-scanning direction indicates the length of the nozzle line in the sub-scanning direction.

When the nozzle line to eject the clear ink composition is provided at a position in the sub-scanning direction so as to be overlapped with one half of the nozzle line to eject the color ink composition located downstream in the sub-scanning direction, by two scans, the color ink composition is adhered to the same region of the recording medium, and of the two scans, by the same scan as the second scan, the clear ink composition is adhered to the same region of the color ink composition.

When the distance of one sub-scan is adjusted, the number of scans to adhere the color ink composition to the same region of the recording medium can be adjusted. When the length of a portion of the nozzle line to eject the color ink composition which is overlapped with the nozzle line to eject the clear ink composition in the sub-scanning direction is adjusted, one scan among the scans to adhere the color ink composition to the same region of the recording medium can be assigned as the same scan to adhere the clear ink composition to the same region of the color ink composition.

In addition, for example, in the lateral scan type ink jet recording apparatus 300 as shown in FIGS. 3 and 4, as described in the example shown in FIGS. 1 and 2, the number of scans and a scan which is the same scan to adhere the color ink composition and the clear ink composition to the same region of the recording medium can be controlled.

In addition, nozzle lines (not shown) to eject the color ink composition and nozzle lines (not shown) to eject the clear ink composition may be arranged so as to be overlapped 100% in the sub-scanning direction SS. In the case described above, when the color ink composition and the clear ink composition are both ejected from the nozzles, a scan which is the simultaneous adhesion can be performed, and when the color ink composition or the clear ink composition is only ejected from the nozzle, a scan which is not the simultaneous adhesion can also be performed.

At least two scans may be performed so as not to perform the sub-scan between the scans. In the case described above, as described above, the scan to adhere only the color ink composition and the scan to simultaneously adhere the color ink composition and the clear ink composition may be performed.

In the case as described above, the number of scans and a scan which is the same scan to adhere the color ink composition and the clear ink composition to the same region of the recording medium can also be controlled.

In the case in which "the color ink composition is adhered to the same scan region by performing the scan at least two times", the scan (main scan) to adhere the color ink composition passes at least two times over the same region of the recording medium. As the number of scans is increased, the color ink composition can be separately adhered to a desired region a plurality of times, and a recorded matter to be obtained tends to have a more excellent image quality.

In the recording method according to this embodiment, the color ink composition which will be described later is adhered to the same scan region by performing the scan (main scan) preferably 5 times or less and more preferably 3 times or less. As the number of main scans is increased, the image quality and the filling property tend to be made excellent; however, according to the recording method of this embodiment, even by the number of scans described above, an excellent image quality can be obtained, and in addition, excellent filling property and abrasion resistance are also preferably obtained.

Since "in the region to which the color ink composition and the clear ink composition are adhered, an adhesion amount of the clear ink composition adhered by the final scan is 80 percent by mass or more of a total adhesion amount of the clear ink composition in the region", a coating film of the color ink can be sufficiently protected by the component of the clear ink, and hence, an excellent abrasion resistance can be obtained. In addition, by at least one scan other than the final scan, the color ink composition and the treatment liquid can be allowed to sufficiently react with each other, and hence, an excellent image quality can be obtained.

From the same point as described above, since a more excellent effect tends to be obtained, in the region to which the color ink composition and the clear ink composition are adhered, the adhesion amount of the clear ink composition adhered by the final scan of the total adhesion amount of the clear ink composition is preferably 90 percent by mass or more, more preferably 95 percent by mass or more, further preferably 98 percent by mass or more, and particularly preferably 100 percent by mass. In addition, "100 percent by mass of the total adhesion amount" indicates that by the same scan as any scan of the at least two scans to be performed before the final scan, the clear ink composition is not adhered to the scan region of the recording medium to which the color ink composition is adhered.

1.2. Treatment Liquid Adhesion Step

The recording method according to this embodiment includes a step (treatment liquid adhesion step) of adhering a treatment liquid containing an aggregating agent to the recording medium.

As a method to adhere the treatment liquid to the recording medium, a non-contact or a contact method, such as an ink jet method, a method to perform coating using a roller or a bar, a method to apply the treatment liquid on the recording medium using various types of sprays, a method to perform coating in a manner such that the recording medium is immersed in the treatment liquid, or a method to apply the treatment liquid on the recording medium using a brush or the like, may be used alone, or at least two types thereof may be used in combination. Among those methods described above, an ink jet method is preferable.

The treatment liquid adhesion step is preferably performed simultaneously with or before the color ink adhesion step which will be described later. In order to simultaneously perform the treatment liquid adhesion step and the color ink adhesion step, for example, when the treatment liquid is ejected from the ink jet head and adhered to the recording medium, the treatment liquid and the color ink composition can be adhered (simultaneous adhesion) to the same scan region by the same scan. The simultaneous adhesion as described above can be performed, for example, in a manner such that in the nozzle surface of the ink jet head, nozzle lines in each of which nozzles are arranged in the sub-scanning direction SS are provided along the main scanning direction MS; when being projected along the main scanning direction, the nozzle lines are arranged so as to be at least partially overlapped with each other in the sub-scanning direction SS; and the color ink composition and the treatment liquid are ejected from the respective nozzle lines.

An adhesion amount of the treatment liquid per unit area of the recording medium is preferably 0.1 to 3.0 mg/inch$^2$, more preferably 0.2 to 2.0 mg/inch$^2$, even more preferably 0.2 to 1.5 mg/inch$^2$, further preferably 0.3 to 1.0 mg/inch$^2$, and particularly preferably 0.3 to 0.8 mg/inch$^2$. When the adhesion amount of the treatment liquid is in the range described above, a more excellent image quality can be obtained, and in addition, more excellent filling property and abrasion resistance tend to be obtained. In addition, the largest adhesion amount of the treatment liquid in the treatment liquid adhesion step may be set in the range described above.

In an area in which the adhesion amount of the color ink composition is largest in the region to which the treatment liquid and the color ink composition are adhered, a total adhesion amount of the treatment liquid with respect to the total adhesion amount of the color ink composition is preferably 1 to 35 percent by mass, more preferably 2 to 30 percent by mass, even more preferably 2 to 10 percent by mass, and further preferably 2 to 8 percent by mass. Accordingly, a more excellent image quality can be obtained, and in addition, more excellent filling property and abrasion resistance tend to be obtained. In addition, the total adhesion amount of the treatment liquid in the region to which the treatment liquid and the color ink composition are adhered may be distributed from the area in which the adhesion amount of the color ink composition is largest to an area in which the adhesion amount of the color ink composition is 40 percent by mass of the largest adhesion amount, to an area in which the adhesion amount of the color ink composition is 60 percent by mass of the largest adhesion amount, to an area in which the adhesion amount of the color ink composition is 80 percent by mass of the largest adhesion amount, or to an area in which the adhesion amount of the color ink composition is 90 percent by mass of the largest adhesion amount.

Treatment Liquid

Hereinafter, components contained in the treatment liquid used for the recording method according to this embodiment will be described. In addition, the treatment liquid is not the color ink composition to be used for coloration of the recording medium and is an auxiliary liquid to be used together with the color ink composition. In addition, although the treatment liquid may contain a colorant such as a pigment, a content thereof with respect to the total mass of the treatment liquid is preferably 0.2 percent by mass or less, more preferably 0.1 percent by mass or less, and further preferably 0.05 percent by mass or less, and a lower limit of the content is 0 percent by mass. The treatment liquid preferably contains no colorant.

Aggregating Agent

The treatment liquid used for the recording method according to this embodiment contains an aggregating agent to aggregate components of the inks (the color ink composition and the clear ink composition). Since reacting with the component, such as the colorant or the resin, the aggregating agent has a function to aggregate the colorant and the resin. By the aggregation as described above, for example, an increase in color development of the colorant, an increase in fixability of the resin, and/or an increase in viscosity of the ink can be performed. However, the degree of aggregation of the colorant and the resin by the aggregating agent is changed depending on the types of aggregating agent, colorant, and resin and can be adjusted.

Although the aggregating agent is not particularly limited, for example, a metal salt, an inorganic acid, an organic acid, or a cationic compound may be mentioned, and as the cationic compound, for example, a cationic resin (cationic polymer) or a cationic surfactant may be used. Among those mentioned above, as the metal salt, a polyvalent metal salt is preferable, and as the cationic compound, a cationic resin is preferable. Hence, as the aggregating agent, an agent selected from the group consisting of the cationic resin, the organic acid, and the polyvalent metal salt is preferably used since excellent image quality, abrasion resistance, glossiness, and the like are obtained.

As the metal salt, although the polyvalent metal salt is preferable, a metal salt other than the polyvalent metal salt may also be used. Among those aggregating agents, in view of excellent reactivity with a component contained in the ink, at least one selected from the group consisting of the metal salt and the organic acid is preferably used. In addition, among the cationic compounds, since being easily dissolved in the treatment liquid, a cationic resin is preferably used. In addition, at least two types of aggregating agents may also be used in combination.

The polyvalent metal salt is a compound formed from at least divalent metal ion and an anion. As the at least divalent metal ion, for example, there may be mentioned an ion of calcium, magnesium, copper, nickel, zinc, barium, aluminum, titanium, strontium, chromium, cobalt, iron, or the like. Among the metal ions forming those polyvalent metal salts, in view of excellent aggregation property of the component of the ink, at least one of a calcium ion and a magnesium ion is preferable.

As the anion forming the polyvalent metal salt, an inorganic ion or an organic ion may be mentioned. That is, the polyvalent metal salt of the present disclosure is a salt formed from a polyvalent metal and an inorganic ion or an organic ion. As the inorganic ion as described above, for example, a chloride ion, a bromide ion, an iodine ion, a nitrate ion, a sulfate ion, or a hydroxide ion may be mentioned. As the organic ion, an organic acid ion may be mentioned, and for example, a carboxylic acid ion may be mentioned.

In addition, the polyvalent metal compound is preferably an ionic polyvalent metal salt, and in particular, when the polyvalent metal salt is a magnesium salt or a calcium salt, the stability of the treatment liquid can be made more excellent. In addition, as a counter ion of the polyvalent metal, either an inorganic acid ion or an organic acid ion may be used.

As a concrete example of the polyvalent metal salt described above, for example, there may be mentioned a calcium carbonate, such as a heavy calcium carbonate or a light calcium carbonate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, copper nitrate, calcium formate, calcium acetate, magnesium acetate, or aluminum acetate. Those polyvalent metal salts may be used alone, or at least two types thereof may be used in combination. Among those mentioned above, since a sufficient solubility to water can be secured, and stains of the treatment liquid are reduced (stains are inconspicuous), at least one selected from the group consisting of calcium formate, magnesium sulfate, calcium nitrate, and calcium chloride is preferable, and calcium formate or calcium nitrate is more preferable. In addition, those metal salts may have hydrated water in a raw material form.

As a metal salt other than the polyvalent metal salt, a monovalent metal salt, such as a sodium salt or a potassium salt, may be mentioned, and for example, sodium sulfate or calcium sulfate may be mentioned.

As the organic acid, for example, a poly(meth)acrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, or a derivative or a salt of one of those acids may be preferably mentioned. The organic acids may be used alone, or at least two types thereof may be used in combination. An organic acid salt in the form of a metal salt is included in the metal salt described above.

As the inorganic acid, for example, sulfuric acid, hydrochloric acid, nitric acid, or phosphoric acid may be mentioned. The inorganic acid may be used alone, or at least two types thereof may be used in combination.

As the cationic resin (cationic polymer), for example, a cationic urethane-based resin, a cationic olefin-based resin, a cationic amine-based resin, or a cationic surfactant may be mentioned. The cationic polymer is preferably water soluble.

As the cationic urethane-based resin, a commercial product may be used, and for example, there may be used Hydran CP-7010, CP-7020, CP-7030, CP-7040, CP-7050, CP-7060, or CP-7610 (trade name, manufactured by DIC Corporation), Superflex 600, 610, 620, 630, 640, or 650 (trade name, manufactured by DKS Co., Ltd.), or urethane emulsion WBR-2120C or WBR-2122C (trade name, manufactured by Taisei Fine Chemical Co., Ltd.).

The cationic olefin-based resin has a structural skeleton of an olefin, such as ethylene or propylene, and a resin appropriately selected from known resins may be used. In addition, the cationic olefin-based resin may be in the form of an emulsion in which the resin is dispersed in a solvent including water, an organic solvent, and/or the like. As the cationic olefin-based resin, a commercial product may be used, and for example, Arrowbase CB-1200 or CD-1200 (trade name, manufactured by Unitika Ltd.) may be mentioned.

As the cationic amine-based resin (cationic polymer), a resin having an amino group in its structure may be used, and a resin appropriately selected from known resins may be used. For example, a polyamine resin, a polyamide resin, or a polyallylamine resin may be mentioned. The polyamine resin is a resin having an amino group in a main skeleton of the resin. The polyamide resin is a resin having an amide group in a main skeleton of the resin. The polyallylamine resin has a structure derived from an allyl group in a main skeleton of the resin.

In addition, as the cationic polyamine-based resin, for example, there may be mentioned UNISENCE KHE103L (hexamethylenediamine/epichlorohydrin resin, pH of 1% aqueous solution: approximately 5.0, viscosity: 20 to 50 (mPa·s), aqueous solution at a solid content concentration of 50 percent by mass) or UNISENCE KHE104L (dimethylamine/epichlorohydrin resin, pH of 1% aqueous solution: approximately 7.0, viscosity: 1 to 10 (mPa·s), aqueous solution at a solid content concentration of 20 percent by mass) manufactured by Senka Corporation). Furthermore, as a concrete example of a commercial product of the cationic polyamine-based resin, for example, there may be mentioned FL-14 (manufactured by SNF), Arafix 100, 251S, 255, or 255LOX (manufactured by Arakawa Chemical Industries, Ltd.), DK-6810, 6853, or 6885, or WS-4010, 4011, 4020, 4024, 4027, or 4030 (manufactured by Seiko PMC Corporation), Papiogen P-105 (manufactured by Senka Corporation), Sumirez Resin 650 (30), 675A, 6615, or SLX-1 (manufactured by Taoka Chemical Co., Ltd.), Catiomaster (registered trademark) PD-1, 7, 30, A, PDT-2, PE-10, PE-30, DT-EH, EPA-SK01, or TMHMDA-E (manufactured by Yokkaichi Chemical Company Limited), or Jetfix 36N, 38A, or 5052 (manufactured by Satoda Chemical Industrial Co., Ltd.).

As the polyamine-based resin, a polyallylamine resin may also be mentioned. As the polyallylamine resin, for example, there may be mentioned a polyallylamine hydrochloride, a polyallylamine amide sulfate, a polyallylamine hydrochloride-diallylamine hydrochloride copolymer, an allylamine acetate-diallylamine acetate copolymer, an allylamine hydrochloride-dimethylallylamine hydrochloride copolymer, an allylamine-dimethylallylamine copolymer, a polydiallylamine hydrochloride, a polymethyldiallylamine hydrochloride, a polymethyldiallylamine amide sulfate, a polymethyldiallylamine acetate, a polydiallyldimethyl ammonium chloride, a diallylamine acetate-sulfur dioxide copolymer, a diallylmethylethyl ammonium ethyl sulfate-sulfur dioxide copolymer, a methyldiallylamine hydrochloride-sulfur dioxide copolymer, a diallyldimethyl ammonium chloride-sulfur dioxide copolymer, or a diallyldimethyl ammonium chloride-acrylamide copolymer.

As the cationic surfactant, for example, there may be mentioned a primary, a secondary, or a tertiary amine salt type compound, an alkylamine salt, a dialkylamine salt, an aliphatic amine salt, a benzalkonium salt, a quaternary ammonium salt, a quaternary alkylammonium salt, an alkylpyridinium salt, a sulfonium salt, a phosphonium salt, an onium salt, or an imidazolinium salt.

At least two types of aggregating agents mentioned above may be used. In addition, among those aggregating agents, when at least one is selected from the group consisting of the polyvalent metal salt, the organic acid, and the cationic resin, the aggregating function can be made more preferable, and hence, an image having a more excellent image quality (in particular, preferable color development property) can be formed.

A content of the aggregating agent in the treatment liquid with respect to the total mass of the treatment liquid is for example, preferably 1 to 20 percent by mass, more preferably 1 to 15 percent by mass, and further preferably 2 to 10 percent by mass. In addition, when the aggregating agent is used in the form of a solution or a dispersion, the content of the aggregating agent on a solid content basis is also preferably set in the range described above. When the content of the aggregating agent is 1 percent by mass or more, an ability of the aggregating agent to aggregate the component contained in the ink tends to be sufficiently obtained. In addition, since the content of the aggregating agent is 20 percent by mass or less, the solubility or the dispersibility of the aggregating agent in the treatment liquid is made more preferable, and for example, the storage stability of the treatment liquid tends to be improved.

Even when the organic solvent contained in the treatment liquid has a high hydrophobic property, in order to enable the aggregating agent to have a preferable solubility in the treatment liquid, an aggregating agent having a solubility of 1 g or more with respect to 100 g of water at 25° C. is preferably used, and an aggregating agent having a solubility of 3 to 80 g is more preferably used.

Surfactant

The treatment liquid used for the recording method according to this embodiment may also contain a surfactant. The surfactant has a function to adjust a surface tension of the treatment liquid, and hence, for example, the wettability thereof to the recording medium may be adjusted. Among the surfactants, for example, an acetylene glycol-based surfactant, a silicone-based surfactant, or a fluorine-based surfactant may be preferably used.

Although the acetylene glycol-based surfactant is not particularly limited, for example, there may be mentioned Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, or DF110D (trade name, manufactured by Air Products and Chemicals Inc.); Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, or AE-3 (trade name, manufactured by Nisshin Chemical Industry Co., Ltd.); or Acetylenol E00, EOOP, E40, or E100 (trade name, manufactured by Kawaken Fine Chemicals Co., Ltd.).

Although the silicone-based surfactant is not particularly limited, a polysiloxane-based compound is preferably mentioned. Although the polysiloxane-based compound is not particularly limited, for example, a polyether-modified organosiloxane may be mentioned. As a commercial product of the polyether-modified organosiloxane, for example, there may be mentioned BYK-306, BYK-307, BYK-333, BYK-341, BYK-345, BYK-346, or BYK-348 (trade name, manufactured by BYK Japan KK); KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.); or Silface SAG002, 005, 503A, or 008 (trade name, manufactured by Nisshin Chemical Industry Co., Ltd.).

As the fluorine-based surfactant, a fluorine modified polymer is preferably used, and as a concrete example, for example, BYK-3440 (manufactured by BYK Japan KK); Surflon S-241, S-242, or S-243 (trade name, manufactured by AGC Seimi Chemical Co., Ltd.); or Ftergent 215 M (manufactured by Neos Co., Ltd.) may be mentioned.

When the surfactant is contained in the treatment liquid, at least two types of surfactants may be contained. A content of the surfactant contained in the treatment liquid with respect to the total mass thereof is preferably 0.1 to 2 percent by mass, more preferably 0.4 to 1.5 percent by mass, and further preferably 0.5 to 1.0 percent by mass.

Organic Solvent

The treatment liquid used for the recording method according to this embodiment may also contain at least one organic solvent. The organic solvent preferably has a water solubility. As one function of the organic solvent, improvement in wettability of the treatment liquid to the recording medium and/or enhancement in moisture retaining property of the treatment liquid may be mentioned. In addition, the organic solvent may also function as a penetrating agent.

As the organic solvent, for example, an ester, an alkyleneglycol ether, a cyclic ester, a nitrogen-containing solvent, or a polyvalent alcohol may be mentioned. As the nitrogen-containing solvent, for example, a cyclic amide or an acyclic amide may be mentioned. As the acyclic amide, for example, an alkoxyalkylamide may be mentioned.

As the ester, there may be mentioned a glycol monoacetate, such as ethylene glycol monomethyl ether acetate, ethylene glycol monoethyl ether acetate, or ethylene glycol monobutyl ether acetate; or a glycol diester, such as ethylene glycol diacetate, diethylene glycol diacetate, or propylene glycol diacetate.

As the alkylene glycol ether, a monoether or a diether of an alkylene glycol may be used, and an alkyl ether is preferable. As a concrete example, there may be mentioned an alkylene glycol monoalkyl ether, such as ethylene glycol monomethyl ether, ethylene glycol monoethyl ether, ethylene glycol monoisopropyl ether, ethylene glycol monobutyl ether, or diethylene glycol monomethyl ether; or an alkylene glycol dialkyl ether, such as ethylene glycol dimethyl ether, ethylene glycol diethyl ether, ethylene glycol dibutyl ether, diethylene glycol dimethyl ether, or diethylene glycol diethyl ether.

As the cyclic ester, there may be mentioned a cyclic ester (lactone), such as β-propiolactone, γ-butyrolactone, δ-valerolactone, ε-caprolactone, or β-butyrolactone, or a compound in which a hydrogen atom of a methylene group adjacent to the carbonyl group of one of those cyclic esters mentioned above is replaced by an alkyl group having 1 to 4 carbon atoms.

As the cyclic amide, a lactam may be mentioned, and for example, there may be mentioned a pyrrolidone, such as 2-pyrrolidone, 1-methyl-2-pyrrolidone, 1-ethyl-2-pyrrolidone, 1-propyl-2-pyrrolidone, or 1-butyl-2-pyrrolidone. Those amides mentioned above are preferable in terms of solubility of the aggregating agent and promotion of film formation of the resin which will be described later, and in particular, 2-pyrrolidone is more preferable.

As the alkoxyalkylamide, for example, there may be mentioned 3-methoxy-N, N-dimethylpropionamide, 3-methoxy-N, N-diethylpropionamide, 3-methoxy-N, N-methylethylpropionamide, 3-ethoxy-N, N-dimethylpropionamide, 3-ethoxy-N, N-diethylpropionamide, 3-ethoxy-N, N-methylethylpropionamide, 3-n-butoxy-N, N-dimethylpropionamide, 3-n-butoxy-N, N-diethylpropionamide, or 3-n-butoxy-N, N-methylethylpropionamide.

In addition, as the alkoxyalkylamide, a compound represented by the following general formula (1) is also preferably used.

$$R^1—O—CH_2CH_2—(C{=}O)—NR^2R^3 \qquad (1)$$

In the above formula (1), $R^1$ represents an alkyl group having 1 to 4 carbon atoms, $R^2$ and $R^3$ each independently represent a methyl group or an ethyl group. As the "alkyl group having 1 to 4 carbon atoms", a linear or branched alkyl group may be used, and for example, a methyl group, an ethyl group, an n-propyl group, an iso-propyl group, an n-butyl group, a sec-butyl group, an iso-butyl group, or a tert-butyl group may be mentioned. The compound represented by the above formula (1) may be used alone, or at least two types thereof may be used after being mixed together.

In addition, as the function of the nitrogen-containing solvent, for example, improvement in surface drying property and fixing property of the treatment liquid adhered to a low-absorbing recording medium may be mentioned.

Although a content of the nitrogen-containing solvent with respect to the total mass of the treatment liquid is not particularly limited, the content described above is preferably 5 to 30 percent by mass and more preferably 10 to 20 percent by mass. When the content described above is in the range described above, the fixing property of an image and the surface drying property thereof (in particular, a surface drying property when the recording is performed in an environment at a high temperature and a high humidity) may be further improved in some cases.

As the polyvalent alcohol, for example, there may be mentioned a 1,2-alkanediol (alkanediol, such as ethylene glycol, propylene glycol (alias: propane-1,2-diol), 1,2-butanediol, 1,2-pentanediol, 1,2-hexanedol, 1,2-heptanediol, or 1,2-octanediol); a polyvalent alcohol (polyol) other than a 1,2-alkanediol (such as diethylene glycol, dipropylene glycol, 1,3-propanediol, 1,3-butanediol (alias: 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, or glycerin).

As the polyvalent alcohol, an alkanediol or a polyol may be mentioned. The alkanediol is preferably a diol of an alkane having 5 carbon atoms or more. The number of carbon atoms of the alkane is preferably 5 to 15, more preferably 6 to 10, and further preferably 6 to 8. As the polyvalent alcohol, a 1,2-alkanediol is preferable.

The polyol is preferably a polyol of an alkane having 4 carbon atoms or less or an intermolecular condensate between hydroxy groups of polyols each having 4 carbon atoms or less. The number of carbon atoms of the alkane is preferably 2 to 3. The number of hydroxy groups in the polyol molecule is 2 or more, preferably 5 or less, and more preferably 3 or less. When the polyol is the intermolecular condensate described above, the number of intermolecular condensations is 2 or more, preferably 4 or less, and more preferably 3 or less. The polyvalent alcohol may be used alone, or at least two types thereof may be used after being mixed together.

The alkanediol and the polyol are able to function primarily as a penetrating solvent and/or a moisture retaining solvent. However, the alkanediol tends to primarily function as a penetrating solvent, and the polyol tends to primarily function as a moisture retaining solvent.

Although a content of the polyvalent alcohol (preferably of the alkanediol) with respect to the total mass of the treatment liquid is not particularly limited, the content described above is preferably 5 to 30 percent by mass and more preferably 10 to 20 percent by mass. Since the content described above is in the range described above, the balance between the wet-spreadability and the drying property is further improved, and in addition, for example, the image quality may tend to be further improved in some cases.

When the treatment liquid contains the organic solvent, the organic solvent may be used alone, or at least two types thereof may be used in combination. In addition, a total content of the organic solvent with respect to the total mass of the treatment liquid is, for example, preferably 5 to 50 percent by mass, more preferably 10 to 45 percent by mass, further preferably 15 to 40 percent by mass, and particularly preferably 20 to 40 percent by mass. Since the content of the organic solvent is in the range described above, the balance between the wet-spreadability and the drying property is further improved, and in addition, an image having a more excellent image quality is more likely to be formed.

In addition, among the organic solvents mentioned above by way of example, the treatment liquid preferably contains an organic solvent having a standard boiling point of 150.0° ° C. to 280.0° C. Accordingly, recording in which an image to be formed is more rapidly dried and fixed can be performed.

Furthermore, the treatment liquid more preferably contains no polyol organic solvent having a standard boiling point of more than 280.0° ° C. at a content of more than 1.0 percent by mass. The content of the polyol organic solvent having a standard boiling point of more than 280.0° C. in the treatment liquid with respect to the total mass thereof is preferably 5 percent by mass or less, more preferably 3 percent by mass or less, even more preferably 1 percent by mass or less, further preferably 0.5 percent by mass or less, and particularly preferably 0.1 percent by mass or less. A lower limit of the content of the polyol organic solvent having a standard boiling point of more than 280.0° C. may be 0 percent by mass.

Accordingly, since an image to be formed has a preferable drying property, more rapid recording can be performed, and the adhesion to the recording medium can also be improved. Furthermore, in the treatment liquid, a content of an organic solvent (not limited to the polyol) having a standard boiling point of more than 280.0° C. is also more preferably controlled in the range described above. As the organic solvent having a standard boiling point of more than 280.0° ° C., for example, glycerin or a poly(ethylene glycol) monomethyl ether may be mentioned.

Water

The treatment liquid used for the recording method according to this embodiment may also contain water. The treatment liquid is preferably an aqueous composition. The aqueous composition indicates a composition containing water as one primary solvent component. Accordingly, recording having reduced environmental loads, such as less odor, can be performed.

The water may also be contained as a primary solvent component of the treatment liquid and is a component to be evaporated and scattered by drying. As the water, pure water, such as ion exchange water, ultrafiltration water, reverse osmosis water, or distilled water, or water, such as ultrapure water, in which ionic impurities are removed as much as possible is preferable. In addition, in the case in which water sterilized, for example, by UV radiation or addition of hydrogen peroxide is used, when the treatment liquid is stored for a long period of time, generation of fungi and bacteria can be preferably suppressed. A content of the water with respect to the total mass of the treatment liquid is preferably 45 percent by mass or more, more preferably 50 to 98 percent by mass, and further preferably 55 to 95 percent by mass.

Other Components

The treatment liquid used for the recording method according to this embodiment may also contain, as an additive, an urea, an amine, and/or a saccharide. As the urea, for example, urea, ethyleneurea, tetramethylurea, thiourea, or 1,3-dimethyl-2-imidazolidinone may be mentioned, and a betaine (such as trimethylglycine, triethylglycine, tripropylglycine, triisopropylglycine, N, N, N-trimethylalanine, N, N, N-triethylalanine, N, N, N-triisopropylalanine, N, N, N-trimethylmethylalanine, carnitine, or acetylcarnitine) may also be mentioned.

As the amine, for example, diethanolamine, triethanolamine, or triisopropanolamine may be mentioned. The urea and the amine may also be used to function as a pH adjuster.

As the saccharide, for example, there may be mentioned glucose, mannose, fructose, ribose, xylose, arabinose, galactose, aldonic acid, glucitol (sorbit), maltose, cellobiose, lactose, sucrose, trehalose, or maltotriose.

Furthermore, the treatment liquid used for the recording method according to this embodiment may also contain, if needed, various types of additives, such as an antiseptic/fungicide agent, an antirust agent, a chelating agent, a viscosity adjuster, an antioxidant, and/or an antifungal agent.

Physical Properties

In order to obtain an appropriate wet-spreadability on the recording medium, the treatment liquid used for the recording method according to this embodiment has a surface tension at 25° C. of 40 mN/m or less, preferably 38 mN/m or less, more preferably 35 mN/m or less, and further preferably 30 mN/m or less. In addition, the measurement of the surface tension can be performed using an automatic surface tensiometer CBVP-Z (manufactured by Kyowa Interface Science Co., Ltd.) in a manner such that a surface tension at which a platinum plate is wetted with a composition in an environment at 25° C. is confirmed.

The treatment liquid is preferably adhered to the recording medium by an ink jet method. In the case described above, a viscosity of the treatment liquid at 20° C. is set to preferably 1.5 to 15 mPa·s, more preferably 1.5 to 7 mPa·s, and further preferably 1.5 to 5.5 mPa·s. When the treatment liquid is adhered to the recording medium by an ink jet method, a predetermined treatment liquid adhesion region can be easily and efficiently formed on the recording medium.

1.3. Color Ink Adhesion Step

The recording method according to this embodiment includes a step (color ink adhesion step) of ejecting a color ink composition containing a colorant from the ink jet head so as to be adhered to the recording medium.

An adhesion amount of the color ink composition per unit area of the recording medium is preferably 1.0 mg/inch$^2$ or more, more preferably 2.0 mg/inch$^2$ or more, even more preferably 4.0 mg/inch$^2$ or more, further preferably 6.0 mg/inch$^2$ or more, even further preferably 8.0 mg/inch$^2$ or more, and particularly preferably 10.0 mg/inch$^2$ or more. In addition, an upper limit of the adhesion amount described above is preferably 25.0 mg/inch$^2$ or less, more preferably 20.0 mg/inch$^2$ or less, and further preferably 15.0 mg/inch$^2$ or less. When the adhesion amount of the color ink composition is in the range described above, a more excellent image quality can be obtained, and in addition, more excellent filling property and abrasion resistance tend to be obtained. In addition, the largest adhesion amount of the color ink composition in the color ink adhesion step may be set in the range described above.

In the step in which the color ink composition is adhered, a surface temperature of the recording medium is preferably 45° C. or less, more preferably 40° ° C. or less, even more preferably 35° C. or less, further preferably 30° C. or less, particularly preferably 28° C. or less, and more particularly preferably equal to a printing environmental temperature. In the step in which the color ink composition is adhered, when the surface temperature of the recording medium is in the range described above, the filling property tends to be made more excellent. In addition, a lower limit of the surface temperature is preferably 20° C. or more and more preferably 25° C. or more.

In addition, the temperature described above is a surface temperature of a portion of a recording surface of the recording medium in the color ink adhesion step to which the liquid is adhered and is the highest temperature in the recording region. In addition, both in the treatment liquid adhesion step and the color ink adhesion step, the surface temperature described above can be preferably set as described above Color Ink Composition Hereinafter, components contained in the color ink composition used for the recording method according to this embodiment will be described.

Colorant

The color ink composition used for the recording method according to this embodiment contains a colorant. As the colorant, for example, a dye and/or a pigment may be mentioned. The colorant is preferably a color colorant, such as a cyan, a yellow, a magenta, or a black colorant.

As the colorant, either the dye or the pigment may be used, and a mixture thereof may also be used. In addition, of the dye and the pigment, the pigment is more preferably contained. The pigment is excellent in storage stability, such as light resistance, weather resistance, and/or gas resistance, and furthermore, from the point described above, an organic pigment is preferable.

In particular, as the pigment, for example, there may be used an azo pigment, such as an insoluble azo pigment, a condensed azo pigment, an azo lake, or a chelating azo pigment; a polycyclic pigment, such as a phthalocyanine pigment, a perylene pigment, a perinone pigment, an anthraquinone pigment, a quinacridone pigment, a dioxane pigment, a thioindigo pigment, an isoindolinone pigment, or a quinophthalone pigment; a dye chelating agent, a dye lake, a nitro pigment, a nitroso pigment, an aniline black, a daylight fluorescent pigment, or a carbon black. The pigments mentioned above may be used alone, or at least two types thereof may be used in combination. Furthermore, as the colorant, a brilliant pigment may also be used.

Although concrete examples of the pigment are not particularly limited, for example, the following may be mentioned.

As a white pigment, for example, a metal compound, such as a metal oxide, barium sulfate, or calcium carbonate, may be mentioned. As the metal oxide, for example, titanium dioxide, zinc oxide, silica, alumina, or magnesium oxide may be mentioned. In addition, as the white pigment, particles each having a hollow structure may also be used, and as the particles each having a hollow structure, known particles may be used.

As the black pigment, for example, there may be mentioned No. 2300, No. 900, MCF88, No. 33, No. 40, No. 45, No. 52, MA7, MA8, MA100, or No. 2200B (manufactured by Mitsubishi Chemical Corporation); Raven 5750, 5250, 5000, 3500, 1255, or 700 (manufactured by Columbia Carbon Company); Regal 400R, 330R, or 660R, Mogul L, or Monarch 700, 800, 880, 900, 1000, 1100, 1300, or 1400 (manufactured by Cabot Japan K.K.); or Color Black FW1, FW2, FW2V, FW18, FW200, S150, S160, or S170, Printex 35, U, V, or 140U, or Special Black 6, 5, 4A, or 4 (manufactured by Degussa).

As a yellow pigment, for example, there may be mentioned C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, or 180.

As a magenta pigment, for example, there may be mentioned C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, or 245, or C.I. Pigment Violet 19, 23, 32, 33, 36, 38, 43, or 50.

As a cyan pigment, for example, there may be mentioned C.I. Pigment Blue 1, 2, 3, 15, 15:1, 15:2, 15:3, 15:34, 15:4, 16, 18, 22, 25, 60, 65, or 66, or C.I. Vat Blue 4 or 60.

In addition, a pigment other than the magenta, the cyan, and the yellow is not particularly limited, and for example, there may be mentioned C.I. Pigment Green 7 or 10, C.I. Pigment Brown 3, 5, 25, or 26, or C.I. Pigment Orange 1, 2, 5, 7, 13, 14, 15, 16, 24, 34, 36, 38, 40, 43, or 63.

A pearl pigment is not particularly limited, and for example, a pigment, such as a titanium dioxide coated mica, a fish scale flake, or bismuth oxychloride, having pearl luster or interference luster may be mentioned.

A metallic pigment is not particularly limited, and for example, there may be mentioned particles formed from a single element, such as aluminum, silver, gold, platinum, nickel, chromium, tin, zinc, indium, titanium, or copper, or particles formed from an alloy containing at least one of the elements mentioned above.

In addition, as the dye, for example, various types of dyes, such as a direct dye, an acidic dye, a food dye, a basic dye, a reactive dye, a disperse dye, a vat dye, a soluble vat dye, and a reactive disperse dye, which are generally used for ink jet recording may be used.

A content of the colorant with respect to a total mass of the color ink composition is preferably 0.3 to 20 percent by mass, more preferably 0.5 to 15 percent by mass, even more preferably 1 to 10 percent by mass, and further preferably 2 to 7 percent by mass.

When the pigment is used as the colorant, a volume average particle diameter of the pigment particles is preferably 10 to 300 nm, more preferably 30 to 250 nm, even more preferably 50 to 250 nm, further preferably 70 to 200 nm, and particularly preferably 80 to 150 nm. When the volume average particle diameter is in the range described above, it is preferable since a desired colorant can be easily available, and characteristics of the colorant can be easily made preferable.

In addition, the volume average particle diameter of the colorant may be measured, for example, using a particle size distribution measurement device. As the particle size distribution measurement device, for example, a particle size distribution meter (such as "Nanotrac Series" manufactured by MicrotracBEL) using a dynamic light scattering method as the measurement principle may be mentioned. The volume average particle diameter indicates a D50 value.

A colorant which can be stably dispersed in a dispersion medium is preferable, and hence, the colorant may be dispersed using a dispersant. As the dispersant, for example, a resin dispersant may be mentioned. In addition, the colorant may be used as a self-dispersible pigment which is obtained such that surfaces of pigment particles are modified by oxidation or sulfonation using ozone, hypochlorous acid, fuming sulfuric acid, or the like.

As the resin dispersant (dispersant resin), for example, there may be mentioned a (meth)acrylic-based resin, such as a poly(meth)acrylic acid, a (meth)acrylic acid-acrylonitrile copolymer, a (meth)acrylic acid-(meth)acrylate ester copolymer, a vinyl acetate-(meth)acrylate ester copolymer, a vinyl acetate-(meth)acrylic acid copolymer, or a vinyl naphthalene-(meth)acrylic acid copolymer, or a salt thereof; a styrene-based resin, such as a styrene-(meth)acrylic acid copolymer, a styrene-(meth)acrylic acid-(meth) acrylate ester copolymer, a styrene-a-methylstyrene-(meth)acrylic acid copolymer, a styrene-a-methylstyrene-(meth)acrylic acid-(meth)acrylate ester copolymer, a styrene-maleic acid copolymer, or a styrene-maleic anhydride copolymer, or a salt thereof; an urethane-based resin which is a linear or branched high molecular weight compound having an urethane bond obtained by a reaction between an isocyanate group and a hydroxy group and which may or may not have a cross-linked structure, or a salt thereof; a poly(vinyl alcohol); a vinylnaphthalene-maleic acid copolymer or a salt thereof; a vinyl acetate-maleic acid ester copolymer or a salt thereof; or a water-soluble resin, such as a vinyl acetate-crotonic acid copolymer, or a salt thereof. Among those mentioned above, a copolymer formed between a monomer having a hydrophobic functional group and a monomer having a hydrophilic functional group or a polymer formed from a monomer having both a hydrophobic functional group and a hydrophilic functional group is preferable. As the structure of the copolymer, any one of a random copolymer, a block copolymer, an alternate copolymer, and a graft copolymer may be used.

As a commercial product of the styrene-based dispersant, for example, there may be mentioned X-200, X-1, X-205, X-220, or X-228 (manufactured by Seiko PMC Corporation), Nopcosperse (registered trademark) 6100 or 6110 (manufactured by San Nopco Limited), Joncryl 67, 586, 611, 678, 680, 682, or 819 (manufactured by BASF), DISPERBYK-190 (manufactured by BYK Japan KK), or N-EA137, N-EA157, N-EA167, N-EA177, N-EA197D, N-EA207D, or E-EN10 (manufactured by DKS Co., Ltd.).

As a commercial product of the acrylic-based resin dispersant, for example, there may be mentioned BYK-187, BYK-190, BYK-191, BYK-194N, or BYK-199 (manufactured by BYK Japan KK), Aron A-210, A6114, AS-1100, AS-1800, A-30SL, A-7250, or CL-2 (manufactured by Toagosei Company, Limited). Furthermore, as a commercial product of the urethane-based resin dispersant, for example, there may be mentioned BYK-182, BYK-183, BYK-184, or BYK-185 (manufactured by BYK Japan KK), TEGO Disperse 710 (manufactured by Evonic Tego Chemi), or Borchi (registered trademark) Gen 1350 (manufactured by OMG Borschers).

The dispersant may be used alone, or at least two types thereof may be used in combination. A total content of the dispersant with respect to 100 parts by mass of the colorant is preferably 10 to 90 parts by mass, more preferably 30 to 80 parts by mass, and further preferably 50 to 70 parts by mass. When the content of the dispersant with respect to 100 parts by mass of the colorant is in the range described above, since reactivity with the treatment liquid is made more excellent, a more excellent image quality can be obtained, and in addition, more excellent filling property and abrasion resistance tend to be obtained.

Among the dispersants mentioned above by way of example, at least one selected from anionic dispersant resins is more preferable. In addition, in the case described above, a weight average molecular weight of the dispersant is preferably 500 or more, more preferably 5,000 to 100,000, and further preferably 10,000 to 50,000.

When the resin dispersant as described above is used as the dispersant, dispersibility and aggregability of the pigment can be made more preferable, and hence, an image having more preferable dispersion stability and image quality can be obtained. In addition, a viscosity increase rate (which will be described later) of the color ink composition can be preferably easily controlled to a predetermined value or more (such as 5 times or more and preferably 10 times or more).

The anionic dispersant resin is a resin which has an anionic functional group and an anionic property. As the anionic functional group, for example, a carboxy group, a sulfo group, a phosphoric group may be mentioned. Among those mentioned above, a carboxy group is more preferable.

The dispersant resin preferably has an acid value, and the acid value is preferably 5 mgKOH/g or more, more preferably 10 to 150 mgKOH/g, even more preferably 15 to 100 mgKOH/g, further preferably 20 to 80 mgKOH/g, and particularly preferably 25 to 50 mgKOH/g. In the case described above, the viscosity increase rate (which will be described later) of the color ink composition can be preferably easily controlled to a predetermined value or more (such as 5 times or more and preferably 10 times or more).

The acid value can be measured in accordance with JIS K0070 using a potentiometric neutralization titration method. As a titration device, for example, "AT610" (manufactured by Kyoto Electronics Manufacturing Co., Ltd.) may be used.

Resin

The color ink composition used for the recording method according to this embodiment may also contain a resin, such as resin particles or a wax. The type, the content, and the like of the resin may be made similar to those of the resin of the clear ink composition which will be described later.

Surfactant

The color ink composition used for the recording method according to this embodiment may also contain a surfactant.

The type, the content, and the like of the surfactant may be made similar to those of the surfactant of the treatment liquid described above.

Organic Solvent

The color ink composition used for the recording method according to this embodiment may also contain an organic solvent. The type, the content, and the like of the organic solvent may be made similar to those of the organic solvent of the treatment liquid described above.

Water

The color ink composition used for the recording method according to this embodiment may also contain water. The type, the content, and the like of the water may be made similar to those of the water of the treatment liquid described above.

Other Components

The color ink composition used for the recording method according to this embodiment may also contain various types of additives, such as an urea, an amine, a saccharide, an antiseptic/fungicide agent, an antirust agent, a chelating agent, a viscosity adjuster, and/or an antioxidant.

Physical Properties

A surface tension and a viscosity of the color ink composition used for the recording method according to this embodiment may be made similar to those of the treatment liquid described above.

Viscosity Increase Rate

When the color ink composition is mixed with the treatment liquid described above at a mass rate of 10:1, respectively, a viscosity increase rate of the color ink composition is preferably 5 times or more, more preferably 7 times or more, even more preferably 9 times or more, and further preferably 10 times or more. An upper limit of the viscosity increase rate is preferably less than 20 times, more preferably less than 15 times, and further preferably less than 13 times. When the viscosity increase rate described above is in the range described above, a more excellent image quality can be obtained, and in addition, more excellent filling property and abrasion resistance tend to be obtained.

In addition, the "viscosity increase rate" of the color ink composition represents a rate (magnification rate) of the viscosity obtained by mixing and stirring the color ink composition and the treatment liquid used for the recording method at a mass rate of 10:1, respectively, to the viscosity of the color ink composition before mixing. The viscosity is measured at 20° C. Hence, the viscosity increase rate is a rate of the viscosity after the mixing to the viscosity before the mixing. In addition, depending on the composition of the treatment liquid and that of the ink, although the viscosity increase rate may be decreased to less than 1.0 time in some cases, the viscosity increase rate is used as the name. In addition, the viscosity may be measured by a rheometer.

The viscosity increase rate of the color ink composition may be adjusted by adjusting the type, the content, and the like of the colorant (including the resin dispersant) and/or the resin. In particular, when the type, the content, and the like of the colorant (including the resin dispersant) are adjusted, the viscosity increase rate described above is preferably easily adjusted.

1.4. Clear Ink Adhesion Step

The recording method according to this embodiment includes a step (clear ink adhesion step) of ejecting a clear ink composition containing a resin from the ink jet head so as to be adhered to the recording medium.

An adhesion amount of the clear ink composition per unit area of the recording medium is preferably 0.5 mg/inch$^2$ or more, more preferably 0.6 mg/inch$^2$ or more, even more preferably 0.7 mg/inch$^2$ or more, further preferably 0.8 mg/inch$^2$ or more, particularly preferably 0.9 mg/inch$^2$ or more, and more particularly preferably 1.0 mg/inch$^2$ or more. In addition, an upper limit of the adhesion amount described above is preferably 5.0 mg/inch$^2$ or less, more preferably 3.0 mg/inch$^2$ or less, further preferably 2.0 mg/inch$^2$ or less, and particularly preferably 1.5 mg/inch$^2$ or less. When the adhesion amount of the clear ink composition is in the range described above, a more excellent image quality can be obtained, and in addition, more excellent filling property and abrasion resistance tend to be obtained. In addition, the largest adhesion amount of the clear ink composition in the clear ink adhesion step may be set in the range described above.

In an area in which the adhesion amount of the color ink compositions is largest in the region to which the color ink composition and the clear ink composition described above are adhered, a total adhesion amount of the clear ink composition with respect to the total adhesion amount of the color ink composition is preferably 5 to 70 percent by mass, more preferably 5 to 60 percent by mass, even more preferably 5 to 50 percent by mass, further preferably 5 to 40 percent by mass, more further preferably 5 to 30 percent by mass, particularly preferably 5 to 20 percent by mass, and more particularly preferably 5 to 15 percent by mass. Accordingly, a more excellent image quality can be obtained, and in addition, more excellent filling property and abrasion resistance tend to be obtained. In addition, the total adhesion amount of the clear ink composition in the region to which the clear ink composition and the color ink composition are adhered may be distributed from the area in which the adhesion amount of the color ink composition is largest to an area in which the adhesion amount of the color ink composition is 40 percent by mass of the largest adhesion amount, to an area in which the adhesion amount of the color ink composition is 60 percent by mass of the largest adhesion amount, to an area in which the adhesion amount of the color ink composition is 80 percent by mass of the largest adhesion amount, or to an area in which the adhesion amount of the color ink composition is 90 percent by mass of the largest adhesion amount.

Clear Ink Composition

Hereinafter, components contained in the clear ink composition used for the recording method according to this embodiment will be described. In addition, the clear ink composition is not a color ink composition to color the recording medium and is a coating liquid to be used together with the color ink composition. In addition, although the clear ink composition may contain a colorant such as a pigment, the content thereof with respect to a total mass of the clear ink composition is preferably 0.2 percent by mass or less, more preferably 0.1 percent by mass or less, and further preferably 0.05 percent by mass or less, and a lower limit of the content described above is 0 percent by mass. The clear ink composition preferably contains no colorant.

Resin

The clear ink composition used for the recording method according to this embodiment contains a resin. As the resin, for example, there may be mentioned resin particles functioning as a so-called fixing resin to improve the adhesion and/or the abrasion resistance of the ink component or a wax having a function to improve the abrasion resistance and the like by imparting slippage to an image to be formed.

Resin Particles

As the resin particles, there may be mentioned resin particles formed, for example, from an urethane-based resin, an acrylic-based resin (including a styrene-acrylic-based resin), a fluorene-based resin, a polyolefin-based resin, a rosin-modified resin, a terpene-based resin, a polyester-based resin, a polyamide-based resin, an epoxy-based resin, a vinyl chloride-based resin, a vinyl chloride-vinyl acetate copolymer, or an ethylene-vinyl acetate-based resin. Among those mentioned above, an urethane-based resin, an acrylic-based resin, a polyolefin-based resin, or a polyester-based resin is preferable. Although being used in the form of an emulsion in many cases, those resin particles may also be used in the form of a powder. In addition, only one type of resin particles may be used alone, or at least two types of resin particles may be used in combination.

The urethane-based resin is a generic name of resins each having an urethane bond. As the urethane-based resin, for example, there may be used a polyether type urethane resin having an ether bond in its main chain besides an urethane bond, a polyester type urethane resin having an ester bond in its main chain besides an urethane bond, or a polycarbonate type urethane resin having a carbonate bond in its main chain besides an urethane bond. In addition, as the urethane-based resin, a commercial product may also be used, and for example, a commercial product selected from Superflex 460, 460s, 840, and E-4000 (trade name, manufactured by DKS Co., Ltd.); Resamine D-1060, D-2020, D-4080, D-4200, D-6300, and D-6455 (trade name, manufactured by Dainichiseika Color & Chemicals Mfg. Co., Ltd.); Takelac WS-6021 and W-512-A-6 (trade name, manufactured by Mitsui Chemicals & Polyurethanes, Inc.); Suncure 2710 (trade name, manufactured by LUBRIZOL); and Permarine UA-150 (trade name, manufactured by Sanyo Chemical Industries, Ltd.) may also be used.

The acrylic-based resin is a generic name of polymers each obtained by polymerizing at least one acrylic-based monomer, such as (meth)acrylic acid or a (meth)acrylic acid ester, as one component, and for example, a resin obtained from an acrylic-based monomer or a copolymer obtained by copolymerization between an acrylic-based monomer and another monomer may be mentioned. For example, an acrylic vinyl-based resin which is a copolymer between an acrylic-based monomer and a vinyl-based monomer may be mentioned. In addition, as the vinyl-based monomer, for example, styrene may be mentioned.

As the acrylic-based monomer, for example, acrylamide or acrylonitrile may also be used. As a resin emulsion formed using an acrylic-based resin as a raw material, a commercial product may also be used, and for example, a commercial product selected from FK-854 (trade name, manufactured by Chuorika Kougyo Co., Ltd.); Movinyl 952B and 718A (trade name, manufactured by Nippon Synthetic Chemical Industry Co., Ltd.); and Nipol LX852 and LX874 (trade name, manufactured by Zeon Corporation) may be used.

In addition, in this specification, the acrylic-based resin may also include a styrene-acrylic-based resin which will be described later. In addition, in this specification, (meth) acrylic indicates acrylic or methacrylic.

The styrene-acrylic-based resin is a copolymer obtained from a styrene monomer and a (meth)acrylic-based monomer, and for example, there may be mentioned a styrene-acrylic acid copolymer, a styrene-methacrylic acid copolymer, a styrene-methacrylic acid-acrylate ester copolymer, a styrene-a-methylstyrene-acrylic acid copolymer, or a styrene-a-methylstyrene-acrylic acid-acrylate ester copolymer. As the styrene-acrylic-based resin, a commercial product may also be used, and for example, Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, or 7610 (trade name, manufactured by BASF); Movinyl 966A or 975N (trade name, manufactured by Nippon Synthetic Chemical Industry Co., Ltd.): or Vinyblan 2586 (manufactured by Nisshin Chemical Industry Co., Ltd.), may be used.

The polyolefin-based resin is a resin having a structural skeleton of an olefin, such as ethylene, propylene, or butylene, and a resin appropriately selected from known resins may be used. As the polyolefin-based resin, a commercial product may be used, and for example, Arowbase CB-1200 or CD-1200 (trade name, manufactured by Unitika Ltd.) may also be used.

In addition, the resin particles may be supplied in the form of an emulsion, and as an example of a commercial product of the resin emulsion as described above, for example, a commercial product may be used after selected from Microgel E-1002 and E-5002 (trade name, styrene-acrylic-based resin emulsion, manufactured by Nippon Paint Co., Ltd.); Voncoat 4001 (trade name, acrylic-based resin emulsion, manufactured by DIC Corporation); Voncoat 5454 (trade name, styrene-acrylic-based resin emulsion, manufactured by DIC Corporation); Polysol AM-710, AM-920, AM-2300, AP-4735, AT-860, and PSASE-4210E (acrylic-based resin emulsion), Polysol AP-7020 (styrene-acrylic resin emulsion), Polysol SH-502 (vinyl acetate resin emulsion), Polysol AD-13, AD-2, AD-10, AD-96, AD-17, and AD-70 (ethylene-vinyl acetate resin emulsion), and Polysol PSASE-6010 (ethylene/vinyl acetate resin emulsion) (trade name, manufactured by Showa Denko K.K.); Polysol SAE1014 (trade name, styrene-acrylic-based resin emulsion, manufactured by Zeon Corporation); Saivinol SK-200 (trade name, acrylic-based resin emulsion, manufactured by Saiden Chemical Industry Co., Ltd.); AE-120A (trade name, acrylic resin emulsion, manufactured by JSR Corporation); AE373D (trade name, carboxy-modified styrene-acrylic resin emulsion, manufactured by Emulsion Technology Co., Ltd.); Seikadyne 1900W (trade name, ethylene-vinyl acetate resin emulsion, manufactured by Dainichiseika Color & Chemicals Mfg. Co., Ltd.); Vinyblan 2682 (acrylic resin emulsion), Vinyblan 2886 (vinyl acetate-acrylic resin emulsion), and Vinyblan 5202 (acetic acid-acrylic resin emulsion) (trade name, manufactured by Nisshin Chemical Industry Co., Ltd.); Elitel KA-5071S, KT-8803, KT-9204, KT-8701, KT-8904, and KT-0507 (trade name, polyester resin emulsion, manufactured by Unitika Ltd.); Hitec SN-2002 (trade name, polyester resin emulsion, manufactured by Toho Chemical Industry Co., Ltd.); Takelac W-6020, W-635, w-6061, W-605, and W-6021 (trade name, urethane-based resin emulsion, manufactured by Mitsui Chemicals Polyurethane); Superflex 870, 800, 150, 420, 460, 470, 610, and 700 (trade name, urethane-based resin emulsion, manufactured by DKS Co., Ltd.): Permarine UA-150 (trade name, urethane-based resin emulsion, manufactured by Sanyo Chemical Industries, Ltd.); Suncure 2710 (trade name, urethane-based resin, manufactured by Lubrizol Japan Ltd.); NeoRez R-9660, R-9637, and R-940 (trade name, urethane-based resin emulsion, manufactured by Kusumoto Chemicals, Ltd.); Adekabontighter HUX-380 and 290K (trade name, urethane-based resin emulsion, manufactured by ADEKA Corporation); Movinyl 966A and Movinyl 7320 (trade name, manufactured by Nippon Synthetic Chemical Industry Co., Ltd.); Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade name, manufactured by BASF); NK Binder R-5HN (trade name, manufactured by Shin-Nakamura Chemical Co., Ltd.); and Hydran WLS-210 (trade name, non-crosslinked polyurethane, manufactured by DIC Corporation).

A glass transition temperature (Tg) of the resin particles is preferably −50° ° C. to 200° ° C., more preferably 0° C. to 150° C., further preferably 50° C. to 100° C., and particularly preferably 50° ° C. to 80° C. When the glass transition temperature (Tg) of the resin particles is in the range described above, the abrasion resistance tends to be made more excellent. The measurement of the glass transition temperature may be performed in accordance with JIS K7121 (plastic transition temperature measurement method) using a differential scan calorimeter "DSC7000" manufactured by Hitachi Hi-Tech Science Corporation.

A volume average particle diameter of the resin particles is preferably 10 to 300 nm, more preferably 30 to 300 nm, further preferably 30 to 250 nm, and particularly preferably 40 to 220 nm. The volume average particle diameter may be measured by the method described above.

An acid value of the resin of the resin particles is preferably 70 mgKOH/g or less, more preferably 60 mgKOH/g or less, further preferably 50 mgKOH/g or less, and particularly preferably 30 mgKOH/g or less. In addition, a lower limit of the acid value described above is preferably 0 mgKOH/g or more, more preferably 5 mgKOH/g or more, and further preferably 10 mgKOH/g or more. In the case described above, a viscosity increase rate (which will be described later) of the clear ink composition is preferably easily set to a predetermined value or more (such as 5 times or more, preferably 10 times or more, and more preferably 15 times or more). The acid value can be measured by the method described above.

A content of the resin particles contained in the clear ink composition with respect to the total mass of the clear ink composition on a solid content basis is 1 to 20 percent by mass, preferably 3 to 15 percent by mass, and more preferably 5 to 10 percent by mass.

Wax

As a component to form the wax, for example, a vegetable/animal-based wax, such as a carnauba wax, a candelilla wax, a beeswax, a rice wax, or a lanolin; a petroleum-based wax such as a paraffin wax, a microcrystalline wax, a polyethylene wax, an oxidized polyethylene wax, or a petrolatum; a mineral-based wax, such as a montan wax or an ozokerite; a synthetic wax, such as a carbon wax, a Hoechst wax, a polyolefin wax, or a stearic acid amide; a natural/synthetic wax emulsion, such as an α-olefin/maleic anhydride copolymer; or a compound wax may be used alone, or at least two types thereof may be used in combination. Among those mentioned above, in view of excellent abrasion resistance, a polyolefin wax (in particular, a polyethylene wax or a polypropylene wax) or a paraffin wax is preferably used.

As the wax, a commercial product itself may also be used, and for example, Nopcoat PEM-17 (trade name, manufactured by San Nopco Limited), Chemipearl W4005 (trade name, manufactured by Mitsui Chemicals, Inc.), or AQUACER 515, 539, or 593 (trade name, manufactured by BYK Japan KK) may be mentioned.

In addition, for example, when a heating step is included in the recording method, in order to suppress degradation in performance of the wax due to excessive melting thereof, a melting point of the wax is preferably 50° ° C. to 200° C., more preferably 70° C. to 180° ° C., and further preferably 90° ° C. to 150° C.

The wax may be supplied in the form of an emulsion or a suspension. A content of the wax with respect to the total mass of the clear ink composition on a solid content basis is preferably 0.1 to 10 percent by mass, more preferably 0.5 to 5 percent by mass, and further preferably 0.5 to 2 percent by mass. When the content of the wax is in the range described above, the function of the wax tends to be more preferably obtained.

Surfactant

The clear ink composition used for the recording method according to this embodiment may also contain a surfactant. The type, the content, and the like of the surfactant may be made similar to those of the surfactant of the above treatment liquid.

Organic Solvent

The clear ink composition used for the recording method according to this embodiment may also contain an organic solvent. The type, the content, and the like of the organic solvent may be made similar to those of the organic solvent of the above treatment liquid.

Water

The clear ink composition used for the recording method according to this embodiment may also contain water. The type, the content, and the like of the water may be made similar to those of the water of the above treatment liquid.

Other Components

The clear ink composition used for the recording method according to this embodiment may also contain various types of additives, such as a urea, an amine, a saccharide, an antiseptic/fungicide agent, an antirust agent, a chelating agent, a viscosity adjuster, and/or an antioxidant.

Physical Properties

A surface tension and a viscosity of the clear ink composition used for the recording method according to this embodiment may be made similar to those described in the above treatment liquid.

Viscosity Increase Rate

A viscosity increase rate of the clear ink composition obtained by mixing the clear ink composition and the treatment liquid at a mass rate of 10:1, respectively, is preferably higher than the viscosity increase rate of the color ink composition obtained by mixing the color ink composition and the treatment liquid at a mass rate of 10:1, respectively, more preferably higher by at least 1.2 times, even more preferably higher by at least 1.3 times, and further preferably higher by at least 1.5 times. Accordingly, the reaction between the color ink composition and the treatment liquid can be more efficiently suppressed, and the image filling property tends to be made more excellent. In addition, an upper limit of the viscosity increase rate of the clear ink composition with respect to the viscosity increase rate of the color ink composition is preferably 3 times or less, more preferably 2.5 times or less, and further preferably 2.0 times or less. Accordingly, since the color ink composition and the treatment liquid are able to sufficiently react with each other, and the ink component can be suppressed from being formed into coarse and large particles, the image quality and the abrasion resistance tend to be made more excellent.

The viscosity increase rate of the clear ink composition obtained by mixing the clear ink composition and the treatment liquid described above at a mass rate of 10: 1, respectively, is preferably 5 times or more, more preferably more than 5 times, even more preferably more than 7 times, further preferably more than 10 times, particularly preferably more than 12 times, and more particularly preferably more than 15 times. Accordingly, the reaction between the color ink composition and the treatment liquid can be more sufficiently suppressed, and the image filling property tends to be made more excellent. In addition, an upper limit of the viscosity increase rate described above is preferably 25 times or less, more preferably 20 times or less, and further preferably 15 times or less. Accordingly, since the color ink composition and the treatment liquid are able to sufficiently react with each other, and the ink component can be suppressed from being formed into coarse and large particles, the image quality and the abrasion resistance tend to be made more excellent.

In addition, the "viscosity increase rate" of the clear ink composition is defined in a manner similar to that of the color ink composition described above.

The viscosity increase rate of the clear ink composition described above can be adjusted by adjusting the type, the content, and the like of the resin and the like. In particular, when the type, the content, and the like of the resin particle emulsion are adjusted, the viscosity increase rate is preferably easily adjusted.

1.5. Primary Drying Step

The recording method according to this embodiment may also include a primary drying step of drying the recording medium before or simultaneously with the treatment liquid adhesion step, the color ink adhesion step, and the clear ink adhesion step. The primary drying step can be performed not only by a measure in which the recording is stopped and left but also by a measure in which drying is performed using a dry mechanism. As the measure in which drying is performed using a dry mechanism, there may be mentioned a measure to send an ordinary temperature wind or a hot wind to the recording medium (ventilation type), a measure in which the recording medium is irradiated with radioactive rays (such as infrared rays) to generate heat (radiation type), or a measure in which heat is conducted to the recording medium from a member in contact therewith (conduction type), and at least two measures described above may also be used in combination. When the drying step is performed, among those described above, the ventilation type is more preferably performed.

In the primary drying step, in particular, the case in which as the dry mechanism, a dry mechanism to heat the recording medium is used is called a heating step (primary heating step). For example, among the dry mechanisms described above, a drying step using a mechanism to send an ordinary temperature wind is not called the heating step.

A surface temperature of the recording medium in the primary drying step is preferably set to the surface temperature of the recording medium in the color ink adhesion step described above. Accordingly, the filling property tends to be made more excellent. In addition, the primary drying step preferably includes no primary heating step.

1.6. Secondary Drying Step

The recording method according to this embodiment may further include a secondary drying step of heating the recording medium after the treatment liquid adhesion step, the color ink adhesion step, and the clear ink adhesion step described above. The secondary drying step may be performed, for example, using an appropriate heating measure. The secondary drying step is performed, for example, by an after heater (corresponding to a heating heater 5 of the example of the ink jet recording apparatus which will be described later). In addition, the heating measure is not limited to the heating measure provided in the ink jet recording apparatus, and another drying measure may also be used. Accordingly, since an image to be obtained can be dried and can be sufficiently fixed, for example, a recorded matter can be rapidly placed in a ready-to-use state.

Although being not particularly limited, the temperature of the recording medium in this case may be set, for example, in consideration of Tg and the like of the resin particles or the wax. In the case described above, the temperature described above is set to be higher than Tg of a resin component forming the resin particles or the wax by 5.0° ° C. or more and preferably by 10.0° C. or more.

A surface temperature of the recording medium obtained by the heating in the secondary drying step is 30.0° ° C. to 120.0° ° C., preferably 40.0° C. to 100.0° C., more preferably 50.0° ° C. to 90° C., and further preferably 60° ° C. to 80° C. The surface temperature of the recording medium obtained by the heating in the secondary drying step is particularly preferably 70° C. or more. When the temperature of the recording medium is in the range as described above, the resin particles or the wax contained in the recorded matter can be formed into a film and planarized, and in addition, an image to be obtained is dried and is likely to be more sufficiently fixed.

2. Recording Apparatus

A recording apparatus according to one embodiment of the present disclosure is a recording apparatus to perform recording by the recording method described above and includes the color ink composition, the clear ink composition, and the ink jet head described above.

According to the recording apparatus of this embodiment, since recording can be performed by the recording method described above, an excellent image quality can be obtained, and in addition, excellent filling property and abrasion resistance can also be obtained.

Hereinafter, one example of the recording apparatus according to this embodiment will be described with reference to the drawings.

2.1. Serial Type Ink Jet Recording Apparatus

FIG. 1 is a schematic cross-sectional view of an ink jet recording apparatus 1. FIG. 2 is a perspective view showing one example of a carriage peripheral structure of the serial type ink jet recording apparatus 1. As shown in FIGS. 1 and 2, the ink jet recording apparatus 1 includes an ink jet head 2, an IR heater 3, a platen heater 4, a heating heater 5, a cooling fan 6, a pre-heater 7, a ventilation fan 8, a carriage 9, a platen 11, a carriage transfer mechanism 13, a transport device 14, and a control portion CONT. In the ink jet recording apparatus 1, by the control portion CONT shown in FIG. 2, the whole operation of the ink jet recording apparatus 1 is controlled.

The ink jet head 2 is configured such that the color ink composition and the clear ink composition (hereinafter, also referred to as "inks" in some cases) are ejected from nozzles of the ink jet head 2 and are then adhered to a recording medium M for recording. In addition, the treatment liquid may also be configured so as to be ejected from nozzles of the ink jet head 2 and then adhered to the recording medium M. In this embodiment, the ink jet head 2 is a serial type ink jet head and is scanned a plurality of times in a main scanning direction relatively with respect to the recording medium M so that the ink is adhered to the recording medium M. The ink jet head 2 is mounted on the carriage 9 as shown in FIG. 2. The ink jet head 2 is scanned a plurality of times in the main scanning direction relatively with respect to the recording medium M by the operation of the carriage transfer mechanism 13 to transfer the carriage 9 in a medium width direction of the recording medium M. The medium width direction indicates the main scanning direction of the ink jet head 2. The scan in the main scanning direction is also called a main scan.

In addition, the main scanning direction indicates a direction in which the carriage 9 mounting the ink jet head 2 is transferred. In FIG. 1, the main scanning direction is a direction intersecting a sub-scanning direction which is a transport direction of the recording medium M shown by an arrow SS. In FIG. 2, a width direction of the recording medium M, that is, the direction shown by S1-S2, is a main scanning direction MS, and a direction shown by T1-T2 is a sub-scanning direction SS. In addition, by one scan in the main scanning direction, the scan is performed in one direction shown by an arrow S1 or S2. In addition, when a main scan of the ink jet head 2 and a sub-scan to transport the recording medium M are repeatedly performed a plurality of times, the recording is performed on the recording medium M. That is, the color ink adhesion step and the clear ink adhesion step, and if needed, the treatment liquid adhesion step are performed by a plurality of main scans to transfer the ink jet head 2 in the main scanning direction and a plurality of sub-scans to transport the recording medium M in the sub-scanning direction intersecting the main scanning direction.

The cartridge 12 to supply the inks and the treatment liquid to the ink jet head 2 includes independent cartridges. The cartridge 12 is detachably fitted to the carriage 9 mounting the ink jet head 2. Different types of inks and the treatment liquid are filled in the respective independent cartridges and are supplied to respective nozzles from the cartridge 12. In addition, in this embodiment, although the case in which the cartridge 12 is mounted on the carriage 9 is shown by way of example, the cartridge 12 is not limited thereto and may be provided at a place other than that of the carriage 9 so that the inks and the treatment liquid are supplied to the respective nozzles by supply tubes not shown.

For the ejection from the ink jet head 2, a related known method can be used. In this embodiment, a method to eject a liquid droplet using the vibration of a piezoelectric element, that is, an ejection method to form an ink droplet by mechanical deformation of an electrostrictive element, is used.

In the ink jet recording apparatus 1, in order to dry the inks ejected from the ink jet head 2 and adhered to the recording medium M, the ventilation fan 8, the IR heater 3, and the platen heater 4 are provided. When the ventilation fan 8, the IR heater 3, and the platen heater 4 are appropriately used in combination, the primary drying step can be performed. In the primary drying step, the recording medium M is not always required to be heated, and the ventilation fan 8 may only be used for ordinary temperature ventilation.

In addition, when the IR heater 3 is used, the recording medium M can be heated by radiation of infrared rays from an ink jet head 2 side. Accordingly, although the ink jet head 2 is also liable to be simultaneously heated, compared to the case in which the recording medium M is heated from a rear surface side thereof by the platen heater 4 and the like, the temperature can be increased without receiving the influence of the thickness of the recording medium M. In addition, various types of fans (such as the ventilation fan 8) to dry the inks on the recording medium M by applying a hot wind or a wind having the same temperature as that in the environment to the recording medium M may also be provided.

In order to rapidly dry the inks ejected from the ink jet head 2 and adhered to the recording medium M, the platen heater 4 can heat the recording medium M at a position facing the ink jet head 2 with the platen 11 interposed therebetween. The platen heater 4 can conductively heat the recording medium M, and hence, the inks can be adhered to the recording medium M which is heated by the platen heater 4.

In addition, an upper limit of the surface temperature of the recording medium M by heating using the IR heater 3 and the platen heater 4 is preferably 50° C. or less, more preferably 45° C. or less, even more preferably 40° C. or less, further preferably 35° C. or less, particularly preferably 30° C. or less, and more particularly preferably 28° C. or less. In addition, a lower limit of the surface temperature of the recording medium M is preferably 25° C. or more.

The heating heater 5 is a secondary heating or a secondary drying heater to dry and fix the inks adhered to the recording medium M. The heating heater 5 can be used for the secondary drying step. Since the heating heater 5 heats the recording medium M on which an image is recorded, for example, moisture contained in the inks is more rapidly evaporated and scattered, and by the resin contained in the clear ink composition, an ink film is formed. As described above, since the ink film is tightly fixed or adhered to the recording medium M, the film forming property can be made excellent, and an image having an excellent image quality can be obtained within a short time.

An upper limit of the surface temperature of the recording medium M by heating using the heating heater 5 is preferably 120° C. or less, more preferably 100° C. or less, and further preferably 80° C. or less. In addition, a lower limit of the surface temperature of the recording medium M is preferably 50° C. or more, more preferably 60° C. or more, and further preferably 70° C. or more. When the temperature is in the range described above, an image having an excellent image quality tends to be obtained within a short time.

The ink jet recording apparatus 1 may also include the cooling fan 6. After the inks recorded on the recording medium M is dried, when the inks on the recording medium M are cooled by the cooling fan 6, the ink film can be formed on the recording medium M with good adhesion.

In addition, in order to heat the recording medium M in advance before the inks are adhered to the recording medium M, the ink jet recording apparatus 1 may also include the pre-heater 7. Furthermore, the ink jet recording apparatus 1 may also include the ventilation fan 8 to more efficiently dry the inks adhered to the recording medium M.

Under the carriage 9, the platen 11 to support the recording medium M, the carriage transfer mechanism 13 to transfer the carriage 9 relatively with respect to the recording medium M, and the transport device 14 which is a roller to transport the recording medium M in the sub-scanning direction are provided. The operation of the carriage transfer mechanism 13 and that of the transport device 14 are controlled by the control portion CONT.

2.2. Lateral Scan Type Ink Jet Recording Apparatus

FIG. 3 is a schematic side view of an ink jet recording apparatus 300 to perform recording by a lateral scan method. FIG. 4 is a schematic plan view of the ink jet recording apparatus 300 to perform recording by a lateral scan method. The ink jet recording apparatus 300 includes a carriage transfer mechanism 310 having a sub-scan axis carriage transfer mechanism 312 and a main-scan axis carriage transfer mechanism 311, a carriage 320 having an ink jet head 2 (not shown) configured similar to that of the ink jet recording apparatus 1 described above, and transport rollers 330 to transport a recording medium M. In addition, at least one transport roller (not shown) to transport the recording medium M in a sub-scanning direction SS may also be included.

The carriage transfer mechanism 310 is a mechanism to arbitrarily transfer the carriage 320 including the ink jet head 2 (not shown) in a main scanning direction MS corresponding to a transport direction of the recording medium M and the sub-scanning direction SS corresponding to a direction orthogonal to the transport direction of the recording medium M. The carriage transfer mechanism 310 is formed of the main-scan axis carriage transfer mechanism 311 to transfer the carriage 320 in the main scanning direction MS, the sub-scan axis carriage transfer mechanism 312 to transfer the main scan axis carriage transfer mechanism 311 in the sub-scanning direction SS, and at least one motor (not shown) to drive those mechanisms.

The carriage 320 is provided in the main scan axis transfer mechanism 311, and when the main scan axis transfer mechanism 311 performs a transfer operation in the main scanning direction MS, the carriage 320 is also transferred in the main scanning direction MS. In addition, when the sub-scan axis transfer mechanism 312 performs a transfer operation in the sub-scanning direction SS, the carriage 320 is also transferred in the sub-scanning direction SS. In addition, while the carriage 320 is transferred in the main scanning direction MS, when the carriage 320 is simultaneously transferred in the sub-scanning direction SS, the carriage 320 can be transferred in an oblique direction with respect to the main scanning direction MS.

As described above, when the main scan to transfer the carriage 320 including the ink jet head 2 or the recording medium M in the main scanning direction MS is performed a plurality of times, an image can be printed on the recording medium M in a print region. Subsequently, the sub-scan to transfer the recording medium M or the carriage 320 in the sub-scanning direction SS intersecting the main scanning direction may be performed. In addition, an operation (image forming operation) to print an image on the recording medium M supplied in the print region and an operation (transport operation) to supply a new recording medium M portion to the print region by transporting the recording medium M in the transport direction using the transport rollers 330 are alternately repeated, many images can be printed on the recording medium M.

In the ink jet recording apparatus 300, although being not shown, an IR heater 3, a platen heater 4, a heating heater 5, a cooling fan 6, a pre-heater 7, a ventilation fan 8, a platen 11, and a control portion CONT may also be included, and the structures thereof may be made similar to those of the ink jet recording apparatus 1 described above.

3. Examples

Hereinafter, although Examples of the present disclosure will be described in more detail, the present disclosure is not limited to the following Examples. Hereinafter, unless otherwise particularly noted, "%" is on a mass basis.

3.1. Preparation of Treatment Liquid, Color Ink Composition, and Clear Ink Composition After components were charged in a container to obtain one of the compositions shown in Table 1 and were then mixed and stirred using a magnetic stirrer for 2 hours, the components were sufficiently mixed together by a dispersion treatment performed by a bead mill filled with zirconia beads having a diameter of 0.3 mm. After the stirring was performed for one hour, filtration was performed using a PTFE-made membrane filter having a size of 5.0 μm, so that each of a treatment liquid (R1), clear ink compositions (CL1 to CL3), and a color ink composition (Col1) was obtained. The numerical value of each component shown in Table 1 is on a percent by mass basis. Pure water was used as the water and was added so that the total mass of each composition was 100 percent by mass. In addition, a colorant, a dispersion resin, a colorant dispersion liquid were used after being prepared as described below.

First, in 155 parts by mass of ion exchange water in which 0.1 parts by mass of 30%-ammonium aqueous solution (neutralizer) was dissolved, 12 parts by mass of an anionic acrylic acid-acrylate ester copolymer (weight average molecular weight: 25,000, acid value: 35) was added and dissolved as a resin dispersant (resin C). In the mixture thus prepared, 18 parts by mass of a carbon black used as a black pigment was added, and a dispersion treatment by a ball mill using zirconia balls was performed for 10 hours. Subsequently, after centrifugal filtration was performed using a centrifugal machine to remove coarse and large particles and impurities such as dirt, the concentration of the carbon black was adjusted to 20 percent by mass, so that a colorant dispersion liquid was obtained. The black pigment had a particle diameter of 60 nm as the average particle diameter.

TABLE 1

| | | TREATMENT LIQUID | CLEAR INK | | | COLOR INK |
|---|---|---|---|---|---|---|
| | | R1 | CL1 | CL2 | CL3 | Col1 |
| AGGREGATING AGENT | CALCIUM FORMATE | 7.0 | | | | |
| COLORANT | CARBON BLACK | | | | | 3.0 |
| DISPERSION RESIN | RESIN C (ANIONIC BASE) | | | | | 2.0 |
| RESIN PARTICLES | STYRENE-ACRYLIC BASE A | | 8.0 | 2.0 | 2.0 | 5.0 |
| | STYRENE-ACRYLIC BASE B | | | 6.0 | | |
| | STYRENE-ACRYLIC BASE C | | | | 6.0 | |

TABLE 1-continued

| | | TREATMENT LIQUID | CLEAR INK | | | COLOR INK |
|---|---|---|---|---|---|---|
| | | R1 | CL1 | CL2 | CL3 | Col1 |
| WAX | POLYETHYLENE BASE | | 1.0 | 1.0 | 1.0 | 1.0 |
| SURFACTANT | SILICONE BASE | 1.0 | 1.0 | 1.0 | 1.0 | 1.0 |
| ORGANIC | 2-PYRROLIDONE | 15.0 | 15.0 | 15.0 | 15.0 | 15.0 |
| SOLVENT | PROPYLENE GLYCOL | 15.0 | 10.0 | 10.0 | 10.0 | 10.0 |
| WATER | PURE WATER | BALANCE | BALANCE | BALANCE | BALANCE | BALANCE |
| TOTAL | | 100 | 100 | 100 | 100 | 100 |
| VISCOSITY INCREASE RATE BY MIXING WITH TEST LIQUID UNDER SAME CONDITIONS OF R1 (TIMES) | | — | 15 | 5 | 20 | 10 |

The description of Table 1 will be further explained.

dispersion resin, Resin C (anionic base): acrylic acid-acrylate ester copolymer (weight average molecular weight: 25,000, acid value: 35)

carbon black: No. 33 (manufactured by Mitsubishi Chemical Corporation)

resin particles, styrene-acrylic base A: see below (high aggregation property)

resin particles, styrene-acrylic base B: see below (low aggregation property)

resin particles, styrene-acrylic base C: see below (higher aggregation property)

wax, polyethylene base: “Nopcoat PEM-17” (trade name, manufactured by San Nopco Limited)

surfactant: silicone-based surfactant “BYK348” manufactured by BYK Japan KK

Preparation of Resin Particles: Styrene-Acrylic-Base B

First, 75 parts by mass of styrene, 0.8 parts by mass of acrylic acid, 14.2 parts by mass of methyl methacrylate, and 10 parts by mass of cyclohexyl methacrylate were emulsion copolymerized, so that a resin emulsion B (acid value: 7 mgKOH/g) was obtained. In addition, as an emulsion polymerization surfactant, Newcol NT-30 (manufactured by Nippon Nyukazai Co., Ltd.) was used, and the use amount thereof was set to 2 parts by mass with respect to 100 parts by mass of the total monomers.

Preparation of Resin Particles: Styrene-Acrylic-Base A

A resin emulsion A (acid value: 30 mgKOH/g) was obtained in a manner similar to that described above except for that the monomer composition was changed. The amount of the emulsion polymerization surfactant was set to 1 part by mass with respect to 100 parts by mass of the total monomers.

Preparation of Resin Particles: Styrene-Acrylic-Base C

A resin emulsion C (acid value: 50 mgKOH/g) was obtained in a manner similar to that described above except for that the monomer composition was changed. The amount of the emulsion polymerization surfactant was set to 1 part by mass with respect to 100 parts by mass of the total monomers.

The “viscosity increase rate by mixing with test liquid under same conditions of R1” shown in Table 1 indicates a rate of the viscosity obtained by mixing one of the clear ink compositions (CL1 to CL3) and the color ink composition (Col1) with a test liquid prepared under the same conditions of the treatment liquid (R1) at a mass rate of 10:1, respectively, to the viscosity of the ink before the mixing. The measurement of the viscosity was performed in a manner such that after a test sample was stirred for one minute, the viscosity thereof was measured at 25° C. and at a shear rate of 200 $s^{-}$ using a rheometer (MCR302, manufactured by Anton Paar).

3.2. Recording Test

In a modified machine of SC-R5050 ink jet printer (manufactured by Seiko Epson Corporation), the color ink composition, the clear ink compositions, and the treatment liquid were filled.

Recording was performed to have the conditions shown in Tables 2 to 3, so that recorded matters of Examples and Comparative Examples were obtained.

In Examples 1 to 6, the treatment liquid and the color ink composition in ejection amounts shown in Table 2 were simultaneously adhered in a first pass, and the treatment liquid, the color ink composition, and the clear ink composition in ejection amounts shown in Table 2 were simultaneously adhered in a second pass, so that the recording was performed. In Example 7, the treatment liquid and the color ink composition in ejection amounts shown in Table 2 were simultaneously adhered in a first pass and a second pass, and the treatment liquid, the color ink composition, and the clear ink composition in ejection amounts shown in Table 2 were simultaneously adhered in a third pass, so that the recording was performed. In Example 8, the treatment liquid and the color ink composition in ejection amounts shown in Table 2 were simultaneously adhered in a first pass, and the color ink composition and the clear ink composition in ejection amounts shown in Table 2 were simultaneously adhered in a second pass, so that the recording was performed. In Example 9, the treatment liquid, the color ink composition, and the clear ink composition in ejection amounts shown in Table 2 were simultaneously adhered in a first pass and a second pass, so that the recording was performed.

In Comparative Example 1, the treatment liquid and the color ink composition in ejection amounts shown in Table 3 were simultaneously adhered in a first pass and a second pass, and the clear ink composition in an ejection amount shown in Table 3 was only adhered in a second pass. In Comparative Examples 2 to 4, the treatment liquid, the color ink composition, and the clear ink composition in ejection amounts shown in Table 3 were simultaneously adhered in a first pass and a second pass. In Comparative Examples 5 and 6, the color ink composition in an ejection amount shown in Table 3 was only adhered in a first pass, and the color ink composition and the clear ink composition in ejection amounts shown in Table 3 were simultaneously adhered in a second pass. In Comparative Example 7, the treatment liquid, the color ink composition, and the clear ink composition in ejection amounts shown in Table 3 were simultaneously adhered in a first pass, so that the recording was performed. In Comparative Example 8, the treatment liquid and the color ink composition in ejection amounts shown in Table 3 were simultaneously adhered in a first pass and a second pass.

Based on a recording resolution of 1,200×1,200 dpi, the number of liquid droplets per one pixel was adjusted so as to have the adhesion amount shown in Tables 2 to 3. The liquid droplet of the treatment liquid had a weight of 3.2 [ng/dot], the liquid droplet of the color ink composition had a weight of 4.6 [ng/dot], and the liquid droplet of the clear ink composition had a weight of 4.6 [ng/dot]. For the secondary heating, heating was performed using a secondary heater located downstream in the transport direction of the recording medium so that the recording medium had a temperature of 70° C. As the recording medium, PET 50A (manufactured by Lintec Corporation) was used.

3.3. Evaluation Method 3.3.1. Abrasion Resistance

The abrasion resistance of the recorded matter obtained as described above was evaluated in accordance with the following criteria. However, as the recording medium, GIY43R5 (transparent vinyl chloride resin, manufactured by Lintec Sign System, Inc.) was used, and as the secondary drying, drying was performed in an environment at 70° C. for 10 minutes.

AA: In Gakushin rubbing test, no peeling is generated by rubbing 10 times with a load of 500 g.

A: In Gakushin rubbing test, peeling is generated by rubbing 10 times with a load of 500 g but is observed only in 10% or less of evaluation area.

B: In Gakushin rubbing test, peeling generated by rubbing 10 times with a load of 500 g is observed in 10% to less than 20% of evaluation area.

C: In a Gakushin rubbing test, peeling generated by rubbing 10 times with a load of 500 g is observed in 20% or more of evaluation area.

3.3.2. Filling Property

A solid image region of the recorded matter obtained as described above was observed by visual inspection under a fluorescent lamp and was then evaluated in accordance with the following criteria.

Criteria

A: neither unfilled portions nor pinholes are observed.

B: small number of unfilled portions and pinholes are observed.

C: unfilled portions and pinholes are apparently observed.

3.3.3. Image Quality

A solid image region of the recorded matter obtained as described above was observed by visual inspection under a fluorescent lamp and was then evaluated in accordance with the following criteria. In addition, the image quality described in this case represents an image quality relating to so-called aggregation irregularity or bleeding irregularity. The irregularity is generated when ink droplets are gathered together on the medium and is influenced by the degree of aggregation of the ink droplets. The degree of aggregation is influenced by the degree of reaction and/or drying.

Criteria

A: no aggregation is observed.

B: aggregation is slightly observed.

C: aggregation is apparently observed.

3.3.4. Ejection Stability

Image recording was performed continuously for one hour under the recording test conditions described above, and nozzles of ejection nozzle group of the color ink composition were inspected after the recording. The number of non-ejection nozzles was divided by the number of total nozzles and then evaluated in accordance with the following criteria.

Criteria

A: rate of non-ejection nozzles is 1.0% or less.

B: rate of non-ejection nozzles is more than 1.0% to 2.0%.

C: rate of non-ejection nozzles is more than 2.0% to 5.0%.

TABLE 2

| | | EXAMPLE 1 | | | EXAMPLE 2 | | | EXAMPLE 3 | | |
|---|---|---|---|---|---|---|---|---|---|---|
| | | TREATMENT LIQUID R1 | COLOR Col1 | CLEAR CL1 | TREATMENT LIQUID R1 | COLOR Col1 | CLEAR CL1 | TREATMENT LIQUID R1 | COLOR Col1 | CLEAR CL1 |
| FIRST PASS | EJECTION AMOUNT [mg/inch2] | 0.29 | 5.3 | 0.0 | 0.29 | 0.9 | 0.0 | 0.29 | 5.3 | 0.0 |
| SECOND PASS | EJECTION AMOUNT [mg/inch2] | 0.29 | 5.3 | 1.06 | 0.29 | 0.9 | 1.06 | 0.29 | 5.3 | 3.97 |
| THIRD PASS | EJECTION AMOUNT [mg/inch2] | — | — | — | — | — | — | — | — | — |
| TOTAL EJECTION AMOUNT [mg/inch2] | | 0.57 | 10.60 | 1.06 | 0.57 | 1.85 | 1.06 | 0.57 | 10.60 | 3.97 |
| RATE OF CLEAR TO COLOR (EJECTION AMOUNT) | | — | — | 10% | — | — | 57% | — | — | 38% |

TABLE 2-continued

| | | | | | | | | | |
|---|---|---|---|---|---|---|---|---|---|
| VISCOSITY INCREASE RATE BY MIXING WITH TREATMENT LIQUID (TIMES) | — | 10 | 15 | — | 10 | 15 | — | 10 | 15 |
| SURFACE TEMPERATURE IN PRINTING | | 25° C. | | | 25° C. | | | 25° C. | |
| ABRASION RESISTANCE | | A | | | B | | | AA | |
| FILLING PROPERTY | | A | | | B | | | B | |
| IMAGE QUALITY | | A | | | A | | | B | |
| EJECTION STABILITY | | A | | | A | | | A | |

| | | EXAMPLE 4 | | | EXAMPLE 5 | | |
|---|---|---|---|---|---|---|---|
| | | TREATMENT LIQUID R1 | COLOR Col1 | CLEAR CL1 | TREATMENT LIQUID R1 | COLOR Col1 | CLEAR CL2 |
| FIRST PASS | EJECTION AMOUNT [mg/inch2] | 0.29 | 5.3 | 0.0 | 0.29 | 5.3 | 0.0 |
| SECOND PASS | EJECTION AMOUNT [mg/inch2] | 0.29 | 5.3 | 1.06 | 0.29 | 5.3 | 1.06 |
| THIRD PASS | EJECTION AMOUNT [mg/inch2] | — | — | — | — | — | — |
| TOTAL EJECTION AMOUNT [mg/inch2] | | 0.57 | 10.60 | 1.06 | 0.57 | 10.80 | 1.00 |
| RATE OF CLEAR TO COLOR (EJECTION AMOUNT) | | — | — | 10% | — | — | 10% |
| VISCOSITY INCREASE RATE BY MIXING WITH TREATMENT LIQUID (TIMES) | | — | 10 | 15 | — | 10 | 5 |
| SURFACE TEMPERATURE IN PRINTING | | | 40° C. | | | 25° C. | |
| ABRASION RESISTANCE | | | A | | | A | |
| FILLING PROPERTY | | | B | | | B | |
| IMAGE QUALITY | | | AA | | | AA | |
| EJECTION STABILITY | | | B | | | A | |

| | | EXAMPLE 6 | | | EXAMPLE 7 | | | EXAMPLE 8 | | | EXAMPLE 9 | | |
|---|---|---|---|---|---|---|---|---|---|---|---|---|---|
| | | TREATMENT LIQUID R1 | COLOR Col1 | CLEAR CL3 | TREATMENT LIQUID R1 | COLOR Col1 | CLEAR CL1 | TREATMENT LIQUID R1 | COLOR Col1 | CLEAR CL1 | TREATMENT LIQUID R1 | COLOR Col1 | CLEAR CL1 |
| FIRST PASS | EJECTION AMOUNT [mg/inch2] | 0.29 | 5.3 | 0.0 | 0.19 | 3.6 | 0.0 | 0.57 | 5.3 | 0.0 | 0.29 | 5.3 | 0.1 |

TABLE 2-continued

| | | | | | | | | | | | | | |
|---|---|---|---|---|---|---|---|---|---|---|---|---|---|
| SECOND PASS | EJECTION AMOUNT [mg/inch2] | 0.29 | 5.3 | 1.06 | 0.19 | 3.8 | 0.0 | 0.00 | 6.3 | 1.06 | 0.29 | 5.3 | 0.96 |
| THIRD PASS | EJECTION AMOUNT [mg/inch2] | — | — | — | 0.19 | 3.6 | 1.06 | — | — | — | — | — | — |
| TOTAL ELECTION AMOUNT [mg/inch2] | | 0.57 | 10.60 | 1.06 | 0.57 | 10.73 | 1.06 | 0.57 | 10.60 | 1.06 | 0.57 | 10.60 | 1.06 |
| RATE OF CLEAR TO COLOR (EJECTION AMOUNT) | | — | — | 10% | — | — | 10% | — | — | 10% | — | — | 10% |
| VISCOSITY INCREASE RATE BY MIXING WITH TREATMENT LIQUID (TIMES) | | — | 10 | 20 | — | 10 | 15 | — | 10 | 15 | — | 10 | 15 |
| SURFACE TEMPERATURE IN PRINTING | | | 25° C. | | | 25° C. | | | 25° C. | | | 25° C. | |
| ABRASION RESISTANCE | | | B | | | A | | | A | | | B | |
| FILLING PROPERTY | | | AA | | | AA | | | AA | | | B | |
| IMAGE QUALITY | | | B | | | AA | | | B | | | B | |
| EJECTION STABILITY | | | A | | | A | | | A | | | A | |

TABLE 3

| | | COMPARATIVE EXAMPLE 1 | | | COMPARATIVE EXAMPLE 2 | | | COMPARATIVE EXAMPLE 3 | | | COMPARATIVE EXAMPLE 4 | | |
|---|---|---|---|---|---|---|---|---|---|---|---|---|---|
| | | TREATMENT LIQUID R1 | COLOR Col1 | CLEAR CL1 | TREATMENT LIQUID R1 | COLOR Col1 | CLEAR CL1 | TREATMENT LIQUID R1 | COLOR Col1 | CLEAR CL1 | TREATMENT LIQUID R1 | COLOR Col1 | CLEAR CL1 |
| FIRST PASS | EJECTION AMOUNT [mg/inch2] | 0.29 | 5.3 | 0.0 | 0.29 | 5.3 | 0.53 | 0.29 | 5.3 | 0.53 | 0.29 | 0.9 | 0.53 |
| SECOND PASS | EJECTION AMOUNT [mg/inch2] | 0.29 | 5.3 | 0.0 | 0.29 | 5.3 | 0.53 | 0.29 | 5.3 | 1.06 | 0.29 | 0.9 | 0.53 |
| THIRD PASS | EJECTION AMOUNT [mg/inch2] | — | — | 1.06 | — | — | — | — | — | — | — | — | — |
| TOTAL EJECTION AMOUNT [mg/inch2] | | 0.57 | 10.60 | 1.06 | 0.57 | 10.60 | 1.06 | 0.57 | 10.60 | 1.59 | 0.57 | 1.85 | 1.06 |
| RATE OF CLEAR TO COLOR (EJECTION AMOUNT) | | — | — | 10% | — | — | 10% | — | — | 15% | — | — | 57% |
| VISCOSITY INCREASE RATE BY MIXING WITH TREATMENT LIQUID (TIMES) | | — | 10 | 15 | — | 10 | 15 | — | 10 | 15 | — | 10 | 15 |

TABLE 3-continued

| | | | | |
|---|---|---|---|---|
| SURFACE TEMPERATURE IN PRINTING | 25° C. | 25°D | 25° C. | 25° C. |
| ABRASION RESISTANCE | AA | C | AA | C |
| FILLING PROPERTY | C | B | B | C |
| IMAGE QUALITY | A | C | C | C |
| EJECTION STABILITY | A | A | A | A |

| | | COMPARATIVE EXAMPLE 5 | | | COMPARATIVE EXAMPLE 6 | | | COMPARATIVE EXAMPLE 7 | | | COMPARATIVE EXAMPLE 8 | | |
|---|---|---|---|---|---|---|---|---|---|---|---|---|---|
| | | TREAT-MENT LIQ-UID R1 | COLOR Col1 | CLEAR CL1 | TREAT-MENT LIQ-UID R1 | COLOR Col1 | CLEAR CL1 | TREAT-MENT LIQ-UID R1 | COLOR Col1 | CLEAR CL1 | TREAT-MENT LIQ-UID R1 | COLOR Col1 | CLEAR CL1 |
| FIRST PASS | EJECT-ION AMOUNT [mg/ inch2] | 0.0 | 5.3 | 0.0 | 0.0 | 5.3 | 0.0 | 0.57 | 10.6 | 1.06 | 0.29 | 5.3 | 0.0 |
| SEC-OND PASS | EJECT-ION AMOUNT [mg/ inch2] | 0.0 | 5.3 | 1.06 | 0.0 | 5.3 | 1.06 | — | — | — | 0.29 | 5.3 | 0.0 |
| THIRD PASS | EJECT-ION AMOUNT [mg/ inch2] | — | — | — | — | — | — | — | — | — | — | — | — |
| TOTAL EJECTION AMOUNT [mg/inch2] | | 0.0 | 10.60 | 1.06 | 0.0 | 10.60 | 1.06 | 0.57 | 10.60 | 1.06 | 0.57 | 10.60 | 0.0 |
| RATE OF CLEAR TO COLOR (EJECTION AMOUNT) | | — | — | 10% | — | — | 10% | — | — | 10% | — | — | 0% |
| VISCOSITY INCREASE RATE BY MIXING WITH TREATMENT LIQUID (TIMES) | | — | 10 | 15 | — | 10 | 15 | — | 10 | 15 | — | 10 | 15 |
| SURFACE TEMPERATURE IN PRINTING | | 50° C. | | | 25° C. | | | 25° C. | | | 25° C. | | |
| ABRASION RESISTANCE | | A | | | B | | | C | | | C | | |
| FILLING PROPERTY | | C | | | B | | | B | | | C | | |
| IMAGE QUALITY | | A | | | C | | | C | | | A | | |
| EJECTION STABILITY | | C | | | A | | | A | | | A | | |

3.4. Evaluation Result

The evaluation results are shown in Tables 2 to 3.

According to Examples of the recording method to perform recording on a recording medium, while a relative position between an ink jet head and the recording medium is transferred, a scan to eject an ink from the ink jet head so as to be adhered to the recording medium is performed a plurality of times for the recording, the method described above comprises a step of adhering a treatment liquid containing an aggregating agent to the recording medium, a step of ejecting a color ink composition containing a colorant from the ink jet head so as to be adhered to the recording medium, and a step of ejecting a clear ink composition containing a resin from the ink jet head so as to be adhered to the recording medium, the color ink composition is adhered to the same scan region by performing the scan at least two times, the clear ink composition is adhered by the same scan as a final scan of the at least two scans to a scan region of the recording medium to which the color ink composition is adhered, and an adhesion amount of the clear ink composition adhered by the final scan in the region to which the color ink composition and the clear ink composition are adhered is 80 percent by mass or more of a total adhesion amount of the clear ink composition in the region; hence, an excellent image quality can be obtained, and in addition, excellent filling property and abrasion resistance can be obtained.

On the other hand, according to Comparative Examples different from Examples described above, at least one of the image quality, the filling property, and the abrasion resistance is inferior.

From the embodiments described above, the following conclusions are obtained.

According to an aspect of the present disclosure, there is provided a recording method to perform recording on a recording medium in a manner such that while a relative position between an ink jet head and the recording medium is transferred, a scan to eject an ink from the ink jet head so as to be adhered to the recording medium is performed a plurality of times for the recording, the method described above comprising: a step of adhering a treatment liquid containing an aggregating agent to the recording medium; a step of ejecting a color ink composition containing a colorant from the ink jet head so as to be adhered to the recording medium; and a step of ejecting a clear ink composition containing a resin from the ink jet head so as to be adhered to the recording medium. In the recording method described above, the color ink composition is adhered to the same scan region by performing the scan at least two times, the clear ink composition is adhered by the same scan as a final scan of the at least two scans to a scan region of the recording medium to which the color ink composition is adhered, and an adhesion amount of the clear ink composition adhered by the final scan in the region to which the color ink composition and the clear ink composition are adhered is 80 percent by mass or more of a total adhesion amount of the clear ink composition in the region.

According to the aspect of the recording method, a viscosity increase rate of the clear ink composition obtained by mixing the clear ink composition and the treatment liquid at a mass rate of 10:1, respectively, may be higher than a viscosity increase rate of the color ink composition obtained by mixing the color ink composition and the treatment liquid at a mass rate of 10:1, respectively.

According to any one of the aspects of the recording method, in an area in which an adhesion amount of the color ink composition is largest in the region to which the color ink composition and the clear ink composition are adhered, the total adhesion amount of the clear ink composition may be 5 to 70 percent by mass with respect to a total adhesion amount of the color ink composition.

According to any one of the aspects of the recording method, in the step of ejecting the color ink composition, the recording medium may have a surface temperature of 45° C. or less.

According to any one of the aspects of the recording method, in the region to which the color ink composition and the clear ink composition are adhered, the adhesion amount of the clear ink composition adhered by the final scan may be 90 percent by mass or more of the total adhesion amount of the clear ink composition.

According to any one of the aspects of the recording method, a viscosity increase rate of the clear ink composition obtained by mixing the clear ink composition and the treatment liquid at a mass rate of 10:1, respectively, may be 5 times or more.

According to any one of the aspects of the recording method, the color ink composition may be adhered to the same scan region by performing the scan 5 times or less.

According to any one of the aspects of the recording method, the recording medium may be a low-absorbing recording medium or a non-absorbing recording medium.

According to another aspect of the recording method, there is provided a recording apparatus to perform recording using the recording method according to any one of the above aspects, the apparatus comprising: the color ink composition; the clear ink composition; and the ink jet head.

The present disclosure is not limited to the embodiments described above and may be variously changed and modified. For example, the present disclosure includes substantially the same structure as the structure described in the embodiment. That is, the substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

What is claimed is:

1. A recording method to perform recording on a recording medium in a manner such that while a relative position between an ink jet head and the recording medium is transferred, a scan to eject an ink from the ink jet head so as to be adhered to the recording medium is performed a plurality of times for the recording, the method comprising:

adhering a treatment liquid containing an aggregating agent to the recording medium, the aggregating agent containing a polyvalent metal salt, an organic acid, or a cationic resin;

ejecting a color ink composition containing a colorant from the ink jet head so as to be adhered to the recording medium; and ejecting a clear ink composition containing a resin from the ink jet head so as to be adhered to the recording medium, the resin contained in the clear ink composition containing resin particles, wherein the clear ink composition is not the same as the treatment liquid, the color ink composition is adhered to the same scan region by performing the scan at least two times, the clear ink composition is adhered by the same scan as a final scan of the at least two scans to a scan region of the recording medium to which the color ink composition is adhered, and an adhesion amount of the clear ink composition adhered by the final scan in the region to which the color ink composition and the clear ink composition are adhered is 80 percent by mass or more of a total adhesion amount of the clear ink composition in the region.

2. The recording method according to claim 1, wherein a viscosity increase rate of the clear ink composition obtained by mixing the clear ink composition and the treatment liquid at a mass rate of 10:1, respectively, is higher than a viscosity increase rate of the color ink composition obtained by mixing the color ink composition and the treatment liquid at a mass rate of 10:1, respectively.

3. The recording method according to claim 1, wherein in an area in which an adhesion amount of the color ink composition is largest in the region to which the color ink composition and the clear ink composition are adhered, the total adhesion amount of the clear ink composition is 5 to 70 percent by mass with respect to a total adhesion amount of the color ink composition.

4. The recording method according to claim 1, wherein in the ejecting the color ink composition, the recording medium has a surface temperature of 45° C. or less.

5. The recording method according to claim 1, wherein in the region to which the color ink composition and the clear ink composition are adhered, the adhesion amount of the clear ink composition adhered by the final scan is 90 percent by mass or more of the total adhesion amount of the clear ink composition.

6. The recording method according to claim 1, wherein a viscosity increase rate of the clear ink composition obtained by mixing the clear ink composition and the treatment liquid at a mass rate of 10:1, respectively, is 5 times or more.

7. The recording method according to claim 1, wherein the color ink composition is adhered to the same scan region by performing the scan 5 times or less.

8. The recording method according to claim 1, wherein the recording medium is a low-absorbing recording medium or a non-absorbing recording medium.

9. A recording apparatus to perform recording using the recording method according to claim 1, the apparatus comprising:

the color ink composition;

the clear ink composition; and the ink jet head.

10. The recording method according to claim 1, wherein the recording medium is a low-absorbing recording medium or a non-absorbing recording medium, the low-absorbing recording medium includes a low-absorbing layer provided to a surface of a substrate, and the non-absorbing recording medium is a plastic film having no absorbing layer.

* * * * *